United States Patent
Johnson et al.

(10) Patent No.: US 9,545,571 B2
(45) Date of Patent: Jan. 17, 2017

(54) METHODS AND APPARATUS FOR A VIDEO GAME MAGIC SYSTEM

(75) Inventors: Ian Johnson, Berkshire (GB); Dominic Jackson, East Sussex (GB); Nouman Hanif, Croydon (GB)

(73) Assignee: Nintendo Co., Ltd., Kyoto (JP)

( * ) Notice: Subject to any disclaimer, the term of this patent is extended or adjusted under 35 U.S.C. 154(b) by 1766 days.

(21) Appl. No.: 12/020,137

(22) Filed: Jan. 25, 2008

(65) Prior Publication Data

US 2009/0191968 A1 Jul. 30, 2009

(51) Int. Cl.
*A63F 13/211* (2014.01)
*A63F 13/42* (2014.01)
*A63F 13/5375* (2014.01)
*A63F 13/40* (2014.01)

(52) U.S. Cl.
CPC .............. *A63F 13/42* (2014.09); *A63F 13/10* (2013.01); *A63F 13/5375* (2014.09); *A63F 13/211* (2014.09); *A63F 2300/105* (2013.01); *A63F 2300/305* (2013.01); *A63F 2300/6045* (2013.01)

(58) Field of Classification Search
CPC .... A63F 13/211; A63F 13/533; A63F 13/822; A63F 2300/105; A63F 2300/807; A63F 2300/305
See application file for complete search history.

(56) References Cited

U.S. PATENT DOCUMENTS

| | | | |
|---|---|---|---|
| 5,757,360 A * | 5/1998 | Nitta et al. | .................... 345/156 |
| 6,354,940 B1 | 3/2002 | Itou et al. | |
| 6,375,571 B1 | 4/2002 | Ohnuma et al. | |
| 6,846,237 B2 | 1/2005 | Ohnuma et al. | |
| 6,860,807 B2 | 3/2005 | Tsuchida | |
| 6,881,149 B2 | 4/2005 | Hasebe et al. | |
| 6,955,603 B2 | 10/2005 | Jeffway, Jr. et al. | |
| 7,001,272 B2 | 2/2006 | Yamashita et al. | |
| 7,445,550 B2 * | 11/2008 | Barney et al. | .................. 463/37 |
| 7,874,918 B2 * | 1/2011 | Osnato et al. | .................. 463/36 |
| 2001/0034257 A1 | 10/2001 | Weston et al. | |
| 2002/0058459 A1 | 5/2002 | Holt | |

(Continued)

FOREIGN PATENT DOCUMENTS

WO    WO 2007069618 A1 *  6/2007    ............. A63F 13/02

OTHER PUBLICATIONS

"Black & White," EA Games User Manual, p. 17, dated 2001, available for download at http://www.replacementdocs.com/download.php?view.341, uploaded to raplcementdocs on Apr. 4, 2005, last accessed on May 28, 2013.*

Bakalar, Jeff, "Nintendo Wii (Original, Wii Sports bundle) review," Nov. 13, 2006, CNET, available at http://www.cnet.com/products/nintendo-wii-original-wii-sports-bundle/.*

(Continued)

*Primary Examiner* — Jay Liddle
(74) *Attorney, Agent, or Firm* — Nixon & Vanderhye, P.C.

(57) ABSTRACT

A system for allowing a player to invoke magic or other special powers in a video game is provided. To activate the magic, the player moves a motion detecting controller in accordance with one or more provided instructions. The outcome of the activation of the magic can be determinate on, for example, speed, accuracy, etc. Controllers in one or both hands may be used, and the instructions can be as simple as single direction gestures and as complex as multi-directional symbols which must be traced in the air. A sequence of any type of instructions may also be provided to instruct the activation of the magic.

16 Claims, 16 Drawing Sheets

(56) References Cited

U.S. PATENT DOCUMENTS

| | | |
|---|---|---|
| 2002/0098890 A1 | 7/2002 | Sakaguchi |
| 2004/0092311 A1 | 5/2004 | Weston et al. |
| 2004/0204240 A1 | 10/2004 | Barney |
| 2005/0119036 A1 | 6/2005 | Albanna et al. |
| 2005/0143173 A1 | 6/2005 | Barney et al. |
| 2005/0266907 A1 | 12/2005 | Weston et al. |
| 2006/0030384 A1 | 2/2006 | Yoshizawa et al. |
| 2006/0030385 A1 | 2/2006 | Barney et al. |
| 2006/0040720 A1 | 2/2006 | Harrison, Jr. |
| 2006/0154726 A1 | 7/2006 | Weston et al. |
| 2006/0287085 A1 | 12/2006 | Mao et al. ............ 463/37 |
| 2007/0066396 A1 | 3/2007 | Weston et al. |
| 2008/0014835 A1 | 1/2008 | Weston et al. |
| 2008/0291160 A1 | 11/2008 | Rabin |
| 2009/0051653 A1 | 2/2009 | Barney et al. |
| 2009/0305207 A1* | 12/2009 | Ueshima et al. ........... 434/258 |
| 2011/0081970 A1 | 4/2011 | Barney et al. |
| 2011/0263330 A1 | 10/2011 | Weston et al. |
| 2011/0300941 A1 | 12/2011 | Weston et al. |

OTHER PUBLICATIONS

Hagendoorn, Ivar, "Emergent Patterns in Dance Improvisation and Choreography," 9 pages (May 29, 2002).

Magerkurth, Carsten, et al., "A Component Based Architecture for Distributed, Pervasive Gaming Applications," ACE 06, Hollywood, California (Jun. 14-16, 2006).

Deposition of Ken Holt, 180 pages, Dec. 16, 2011.

http://www.magiclabs.net/, screen shot of Magic Labs website home page, 1 page, printed Dec. 22, 2011.

Deposition of Kenneth Holt, Investigation No. 337-TA-770 dated Dec. 16, 2011.

Deposition of Kenneth Holt (condensed), Investigation No. 337-TA-770 dated Dec. 16, 2011.

Public Hearing, Investigation No. 337-TA-770 dated Feb. 14, 2012.

Public Hearing, Investigation No. 337-TA-770 dated Feb. 15, 2012.

Public Hearing, Investigation No. 337-TA-770 dated Feb. 16, 2012.

Witness Statement of Kenneth Holt, ITC Inv. No. 337-TA-770 dated Jan. 6, 2012.

Expert Report of Kenneth Holt dated Nov. 3, 2011.

\* cited by examiner

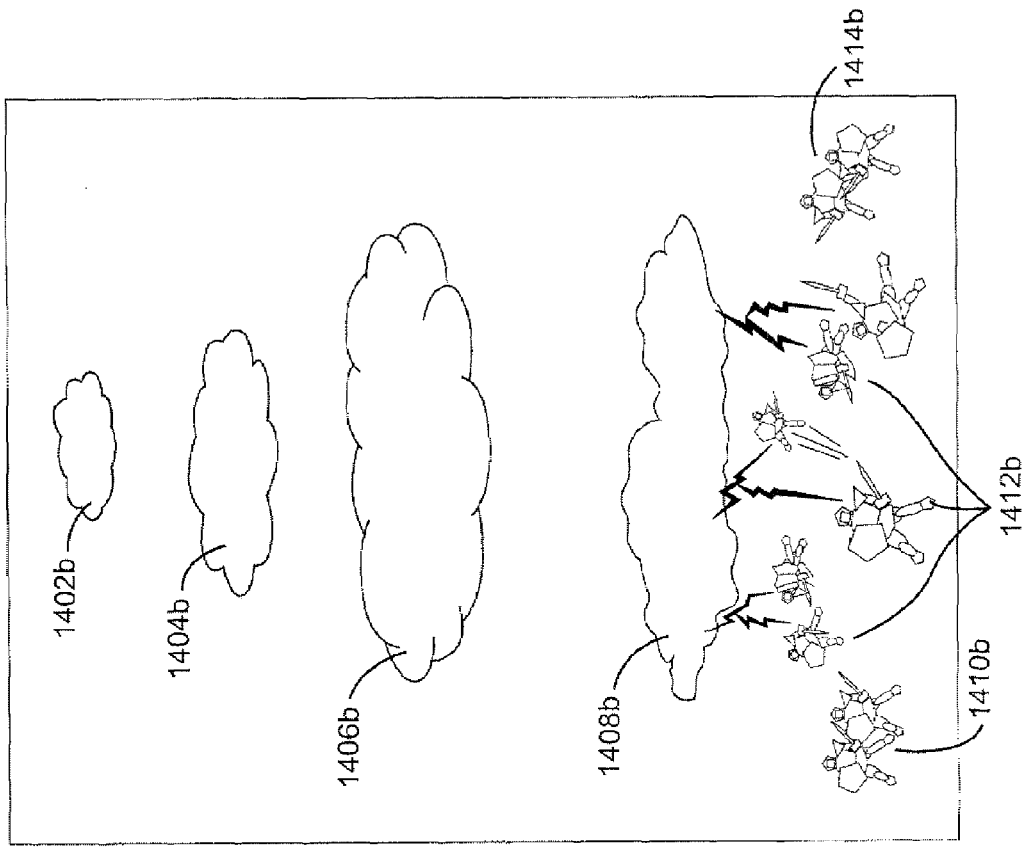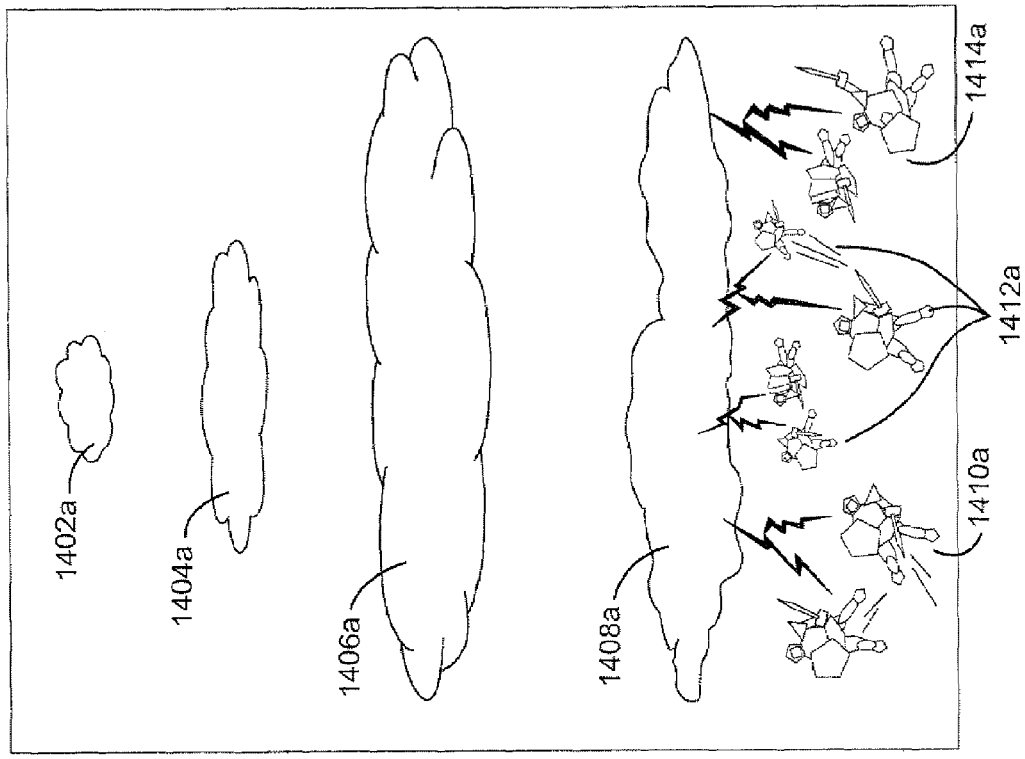

NON-LIMITING
EXAMPLE GAME SYSTEM

NON-LIMITING
EXAMPLE CONTROLLER

NON-LIMITING
EXAMPLE CONTROLLER

METHODS AND APPARATUS FOR A VIDEO GAME MAGIC SYSTEM

TECHNOLOGICAL FIELD

The technology herein relates to simulating magic in a video game. More particularly, the technology herein relates to a magic invoking system used in conjunction with a video game, wherein one or more controllers are used to input one or more commands to cause a magical effect to occur in the game. Even more particularly, the technology herein relates to a magic system used in conjunction with a video game, wherein one or more motion sensing controllers are moved spatially in accordance with instructions displayed on a screen to produce a magic effect in the video game.

BACKGROUND AND SUMMARY

Since ancient times, magic has been the stuff of legend and lore within human culture. Found in one form or another in almost every culture, magic brings to mind the invocation and conjuration of the humanly impossible. From ancient tribes where shamans and priests were mystical spiritual leaders thought to have supernatural powers, to modern day illusionists like David Copperfield and Chris Angel, to fictitious literary and movie characters, people have always been fascinated by the abilities or perceived abilities of these masters of the mystic.

A common thread that can be recognized through almost all examples of magic, ancient or modern, is the showmanship that goes hand-in-hand with the spell-caster at work. Whether it is a ritual dance or movements or the waving of hands or a wand, whenever society portrays magic, it is almost always accompanied by some form of gesture.

In the Lord of The Rings movies, we see Gandalf wielding a staff to bring magic to bear against his enemies. In Disney's animated The Sword in the Stone, Merlin is constantly waving his wand about and wreaking all sorts of magical havoc. Even in the Star Wars movies, Jedi, masters of a mystic force surrounding all things, gesture with their hands to move objects and create lightning. One common thread these magic castings share is the use of gesture based spell "summoning." Such gestures help add to the sense that the caster is actually controlling the magic.

Magic, magic spells, and magic systems also play a role in many different video games. From role-playing games (RPGs) to battle-type games, numerous player-controlled characters, enemies, and game-controlled characters (NPCs) wield magic in the form of spells, magic items, and magical abilities.

For example, in a traditional role playing game (RPG), the game character may have the ability to cast spells. To instruct this ability's use, the player may press a key that corresponds to the desired spell. Alternatively, the player may be provided with a list of available spells, and then may use a directional pad or other control element to parse through the list and select a desired spell. Either way, in many RPGs, the spell casting often involves little more than a selection or depression of a single key to trigger a spell.

An alternative form of casting magic spells or using magic abilities is often found in battle-type games, where players engage the computer or other players in one-on-one combat. Typically, in these games, it is not desirable to pause play while a spell is cast or an ability is used, since both sides are actively trying to attack each other as quickly as possible. If game play were paused every time a player used a character ability, this genre's fast-paced, adrenaline pumping aspect would all but vanish.

Due to a desire not to freeze the game while a player selects a desired spell or skill, game developers instead have linked all of the skills and spells to a series of input commands. For example, to shoot a fireball, a player might rotate a directional pad in a half-circle, then sequentially press one or more buttons. If performed successfully, the fireball effect is generated. If performed unsuccessfully, there is no fireball. This allows the game play to continue as spells and abilities are used.

In these types of games, the player often creates a magic effect through use of buttons, joysticks and other controls provided on a controller.

With the advent of video game systems provided with motion sensing controllers, players have an opportunity to immerse themselves in wholly new aspects of their favorite game genres. From swinging a sword (by swinging a controller) to throwing a punch (by punching with a hand holding a controller), lovers of role playing and battle-type games alike can now more fully suspend reality and pretend they are immersed within the game. But, while swinging a sword and throwing a punch are "real" based motions, there is likely no known "standard" motion for calling a lightning storm down on your foes. The exemplary illustrative non-limiting implementations herein, provide a magic invoking system that allows a player to experience some of these more fantastic game aspects.

An exemplary game is presented herein purely for exemplary purposes, and is not intended to limit the invention in any way. Magic in this exemplary game is associated with nature, the spirit world, and life and death energies. The spells used in the exemplary game play on medieval sensibilities and superstitions about how the world works and the forces that drive it.

Heroes use magic to sway the course of a battle, not just as another weapon. Their spells are mostly large scale events which hinder the enemy or give the caster's own forces an advantage. Heroes could alternatively be given smaller scale, more personal spells, or a combination of both.

In this exemplary implementation, each faction which represents a "side," has a handful of spells which its heroes can use, and it may only be possible to cast the most powerful of these spells once or twice during the course of a typical mission. The focus is on using the right spell at the right time to turn the tide of the battle in your army's favor, rather than directly attacking a specific unit. Any other suitable implementation of a magic system could also be provided. For example, heroes could use numerous spells against individual foes almost perpetually throughout the game.

According to one exemplary illustrative non-limiting implementation, players can activate a magic mode within a game and select a spell to cast. Then, in this exemplary implementation, a series of one or more symbols is displayed on the screen. These symbols indicate patterns that the player, using the motion sensitive controller, is to replicate.

In this exemplary implementation, the symbols are displayed one at a time, and the player either succeeds or fails in the implementation. Failure does not end the sequence. Rather, the next symbol is displayed. Once all symbols have been displayed and attempted, the corresponding spell is cast.

According to this exemplary implementation, the spell is altered based on player successes and failures during input. Additionally, while the player is provided with a limited time during which to enter a symbol, a fast player can complete the symbol before the time expires, and this may also add power to the spell.

Spells can also consist of single symbols, as opposed to a series of symbols, as simple as a single line and as complicated as a designer's imagination. Further, all of the symbols for a spell sequence could be displayed at the same time, or the next symbol could be displayed with the present one, etc. And, spells could fail upon failing a single gesture, or gesture failure could result in other penalties, such as increased magic cost to cast a spell, etc. Massive failure could even cause a spell to backfire on the player. Numerous variations of the magic invoking system presented herein are possible, and all are contemplated to be within the scope of the present invention. For example, players could also be instructed by a series of directional arrows, showing them in which general directions to move a controller.

In another exemplary illustrative non-limiting implementation, the player is provided with several different schools of magic from which to choose spells. In this exemplary implementation, all of the spells from a similar school share certain characteristics. For example, air/weather spells may often have swirly gestures associated therewith, reminiscent of air currents. Spells from a school closely associated with technology may all have aspects of or actually be mathematical symbols. Alternatively, each spell may be wholly unique, or share no intended characteristics with other spells (although it is likely that many spells will incidentally share characteristics, regardless of developer intention).

In the exemplary illustrative game presented herein, players are provided with a variety of Factions from which to choose. The various exemplary Factions match up with different Schools of Magic as follows:

| Faction | Magic |
| --- | --- |
| Arkland | Weather |
| Reusmen | Animal |
| Guardian Empire | Science |
| Malbett | Death |

In the disclosed example, each Faction's selection of spells is related to their cultural traits. For example, Arklanders have an affinity to the weather, so their spells are all based around controlling the weather.

According to one exemplary illustrative non-limiting implementation, the player is provided with two motion sensitive controllers, one for each hand. In this exemplary implementation, when a symbol is displayed, it may actually show two patterns, one to be performed with each handheld controller. These patterns could be the same pattern, they could be mirror images of one another, or they could be completely unrelated.

Since it is likely easier to draw two straight line simultaneously than it is to draw a square with one hand while drawing a spiral with another, the more disjoint the connection between the symbols the more powerful the spell may be. Spell power can also be unrelated to the difficulty in casting the spell. For example, certain difficult spells may not be powerful at all, but useful in certain situations, so the player must simply master the difficult spell to successfully overcome an obstacle.

Because the symbols can often contain overlapping lines, in one exemplary illustrative non-limiting implementation a moving guide is provided to show the player where to move the controller. The guide begins at a start position, and moves along the path of the symbol. The player can then make a motion similar to the path of the guide. Alternatively, the guide can mirror the player's movement, or several guides can be provided, one showing the path, and one mirroring the movement. Or, if it is desired to make the casting more difficult, the guide can be left out of the system.

Another aspect of an exemplary illustrative non-limiting implementation is a magic reservoir associated with a game character. In this exemplary implementation, a spell requires a certain amount of power to cast. As each gesture is attempted, a fraction of the cost of the spell is depleted from the magic reservoir. According to this exemplary implementation, the spell can be aborted by the player at any point, but any magic used prior to the abort is forfeited. Players could also suffer different penalties for aborting a spell, or be prohibited from quitting the spell once started. In this exemplary implementation, an equal fraction of the cost is deducted each time, but the power deduction can be done by any suitable means. It could be random, it could be increasing over time, it could be half while casting and half upon actual cast, etc.

Additional aspects of exemplary illustrative non-limiting implementations include:
Slowed time while a player is casting a spell
  Not only animation slows, but also associated audio may slow
Spell selection overlay once a player enters a mode for casting magic
Spell gestures generally form a pictogram emblematic of the spell being cast
Gathering magic energy represented in the form of some faction related animation—e.g. weather spell-caster may have clouds and lightning gathering around him as he prepares to cast
Different casting animations for successful and unsuccessful gesture completion
Targeting of spells upon completion of casting
Indicia of success and failure
  Visual, audible, tactile, etc.
Different animations for different levels of spell success
Scaled feedback based on strength of spell—e.g. a poorly cast hurricane might have a soft sound, small controller vibration, etc, while a well cast one might have a howling sound and cause the controller to vibrate furiously.

BRIEF DESCRIPTION OF THE DRAWINGS

These and other features and advantages will be better and more completely understood by referring to the following detailed description of exemplary illustrative non-limiting implementations in conjunction with the drawings of which:

FIGS. 9A & 9B show exemplary results of the spell of FIG. 8 cast with varying degrees of success;

DETAILED DESCRIPTION OF THE INVENTION

Exemplary Video Game

A description of an exemplary, illustrative, non-limiting medieval battle video game accompanies many of the descriptions herein. These game examples are solely provided for exemplary purposes, and are not intended to limit the scope of the invention in any way.

Figure 1:
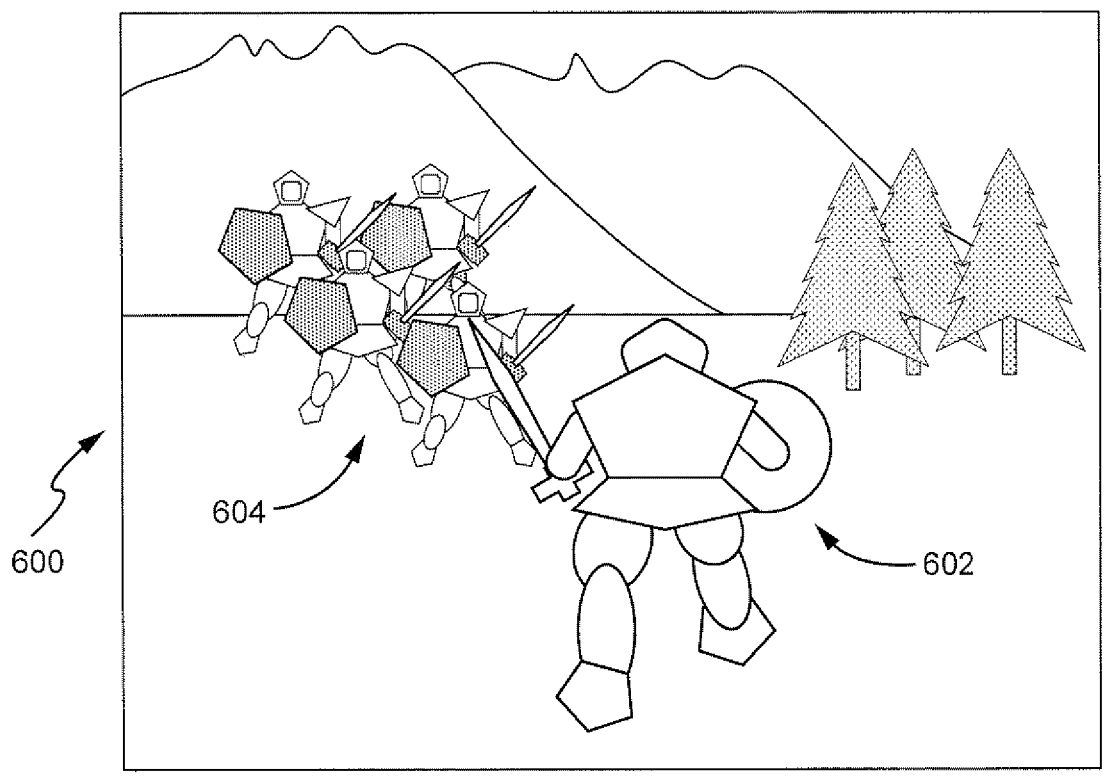
FIG. 1 shows an exemplary game environment.

FIG. 1 shows an exemplary illustrative non-limiting game environment 600, in which a game character 602 is approaching a group of enemies 604. Although the perspective in this game environment is third person, any suitable perspective, such as first person, can be used. The game can also switch between viewing perspectives if desired.

At this point in the game, if the hero 602 elected to use magic against his enemies, the magic invoking system could be activated. The hero could also elect to battle his enemies with his weapon or any other means at his disposal.

Figure 2:
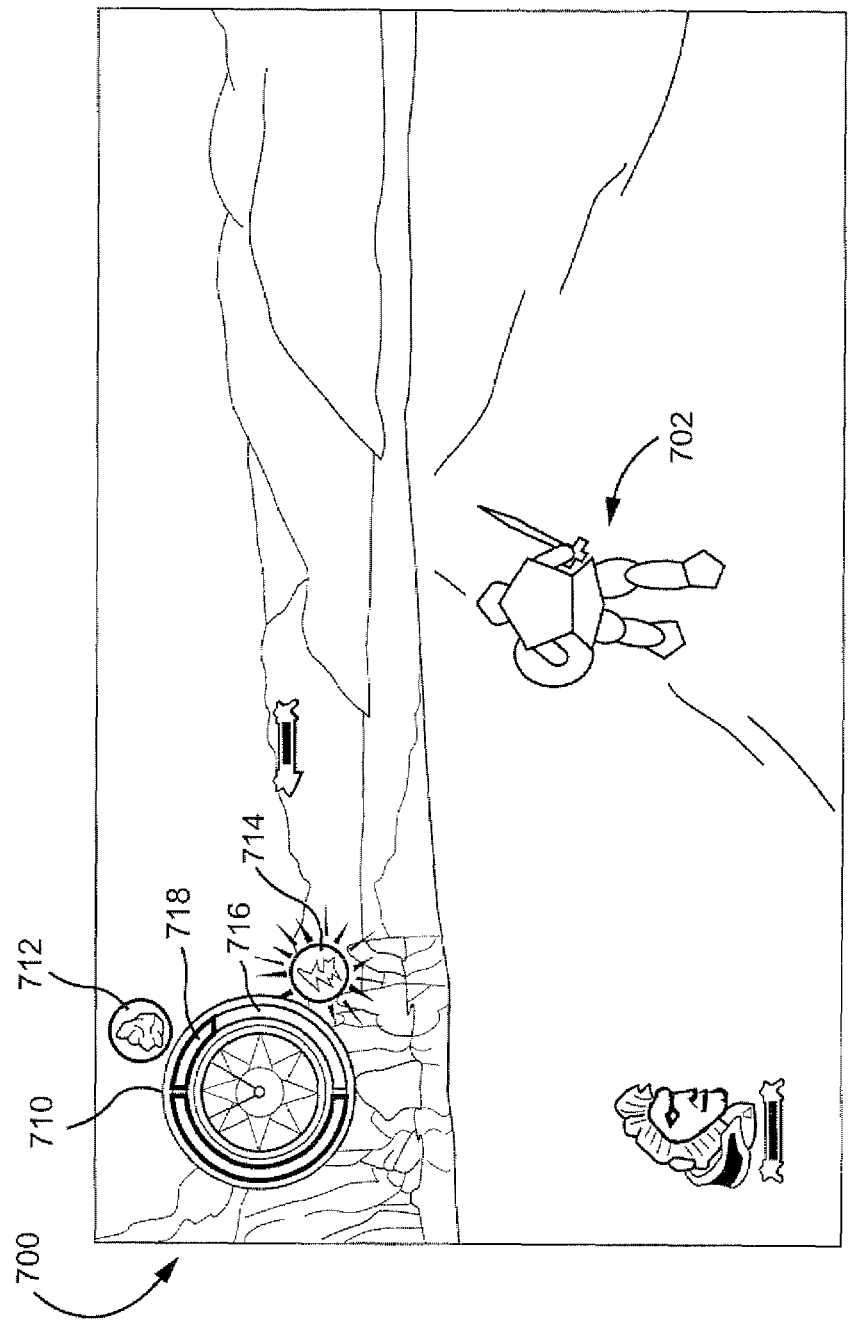
FIG. 2 shows another exemplary game environment including a player status overlay having associated magic aspects.

FIG. 2 shows another exemplary game environment 700 including a player status overlay 710 having associated magic aspects. In this exemplary view, a game character 702 is adventuring through a game world. In the upper left hand corner of the screen, an exemplary illustrative non-limiting player status overlay 710 is provided (commonly referred to as the Heads Up Display, or (HUD)). This overlay could be provided anywhere on the screen, provided in a different form, or omitted entirely.

According to this exemplary implementation, the player status overlay is provided with a number of available spells 712, 714. Adjacent to the spell icons 712, 714, a magic meter shows both a magic reservoir 718 and an available present amount of magic power 716. In this implementation, as the available present amount of magic power 716 fills the reservoir 718, it gradually passes the spells 712, 714 arranged next to the reservoir 718. As a spell is passed, the spell icon 714 lights up, indicating that the character has sufficient magic power 716 to cast that spell. In this implementation, the more powerful the spell, the more magic power 716 is required, so the character may have to adventure further and build up additional power 716 to cast a more powerful spell 712.

The reservoir 718 is only one way of displaying available power, it could also consist of bars displayed on a screen, information displayed in a pop-up menu, or any other suitable method of informing the player how much power the character presently has. Additionally, the use of a power "reservoir" could be omitted entirely.

According to the exemplary game implementation, if the player elects to attempt spell-casting, the player selects the spell they wish to cast as follows—

Pressing a Magic button puts the game into 'Magic Mode'. A hero 702 character sheathes a weapon and shield to free their hands for casting, and a special Magic Mode cursor appears on the screen.

While in Magic Mode time may pass more slowly than normal, causing the on-screen action (and related audio) to slow down noticeably. This allows the player time to select, cast and target a spell even in the heat of battle.

The hero may not be able to move, fight or give orders while in Magic Mode though. This may leave them vulnerable to attack, and they may take more damage than normal if an enemy hits them while they're in Magic Mode. However, this will not interrupt the casting of the spell.

The player can leave Magic Mode without casting (or even selecting) a spell by pressing the Magic button again at any time. If they do this after they start casting the spell, they will lose a proportion of the normal Power cost of the spell, based on how far through casting it they got before cancelling it.

Otherwise the game remains in Magic Mode until the spell has been cast.

Some further non-limiting examples of considerations for the HUD include, but are not limited to:

Positioning of spell icons in a SELECT state, such that when a magic mode is activated, the player can select from various icons positioned around the HUD.

Moving the controller in any direction during selection could cause the selection highlight cycle between available spells. Scroll regions on the screen could also be used for this purpose.

Displaying a shape comprising all the spell gesture upon a player's completing the gesturing phase. This may require adding a delay timer to be used between CAST and TARGETING states. If the spell gestures collectively formed a pictogram, this would allow the player to see the pictogram formed as an aggregate of the gestures.

Separate screen FX for each spell to be used by hero when triggering a spell.

Figure 3:
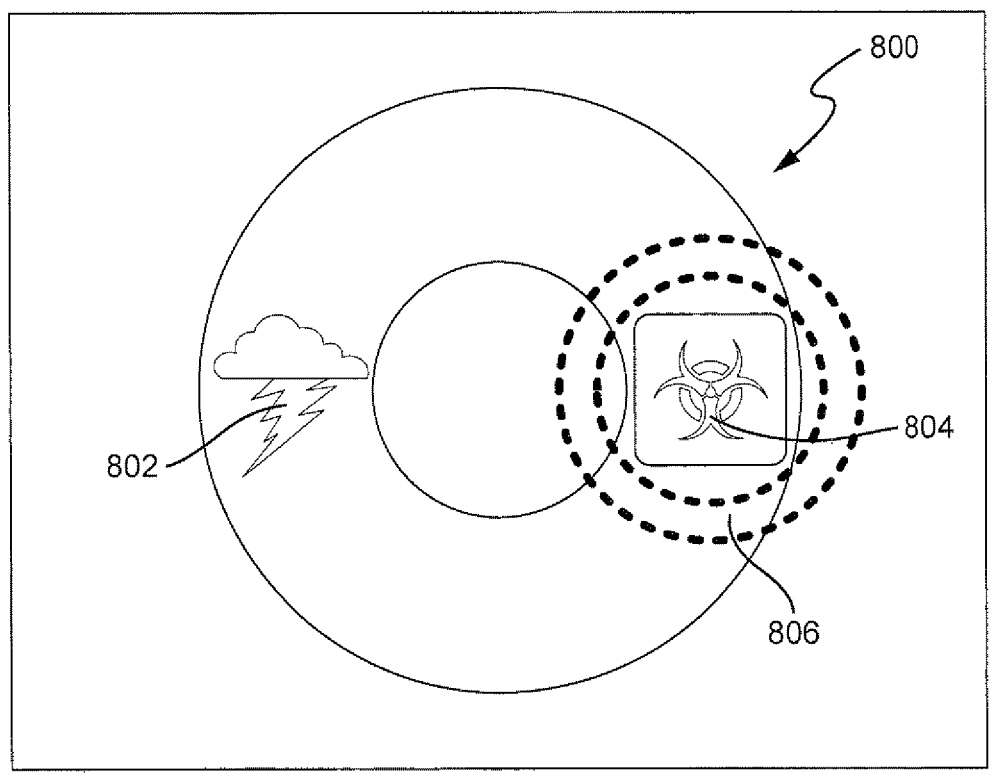
FIG. 3 shows an exemplary magic selection menu.

FIG. 3 shows an exemplary magic selection menu tool 800. In the example, this tool is usable once a player has entered a Magic Mode, however, this tool could be provided for player use at any point in a game, even if a Magic Mode were not included in a game. Additionally, this is simply one example of a method by which spell selection may be performed.

In this exemplary illustrative non-limiting implementation, the player currently has access to two spells 802, 804. The first, a lightning spell, is designated by the lightning icon 802. The second, a poison spell, is designated by the biohazard icon 804. The player can use any one of a number of control options to move the spell selection reticle 806 over the desired spell. The player can have any number of available spells shown on this menu, and in this exemplary embodiment, spells for which the player does not have enough power are grayed out and unselectable.

Although FIG. 3 shows a magic selection display detached from the game environment, this selection menu could, for example, be provided in place of or as a part of the HUD 710 shown in FIG. 2. It could further be shown in some form of overlay over the screen, possibly semi-transparent, or in a secondary menu. The menu can also be a drop down menu, or any other form of suitable presentation of spells. It could be a 3-D menu, with spells arranged in a ring around a Z-axis. Other menus may also be used.

According to the exemplary implementation:

When the player enters Magic Mode, the icons for spells that the hero has learned appear arranged around a ring 800 (provided in place of or as part of the HUD). Any spells which require more power than the Hero currently has are greyed out.

As the player moves a controller around, the game cycles between the spells displayed on the HUD—the player doesn't have to precisely target an icon to highlight it, just move the controller in the right direction.

Once the player has the spell they want highlighted, the player may press a button to select the spell.

The selected spell's icon then moves and increases in size to show that it's being cast, and the remaining HUD spell icons may disappear.

Figure 4:
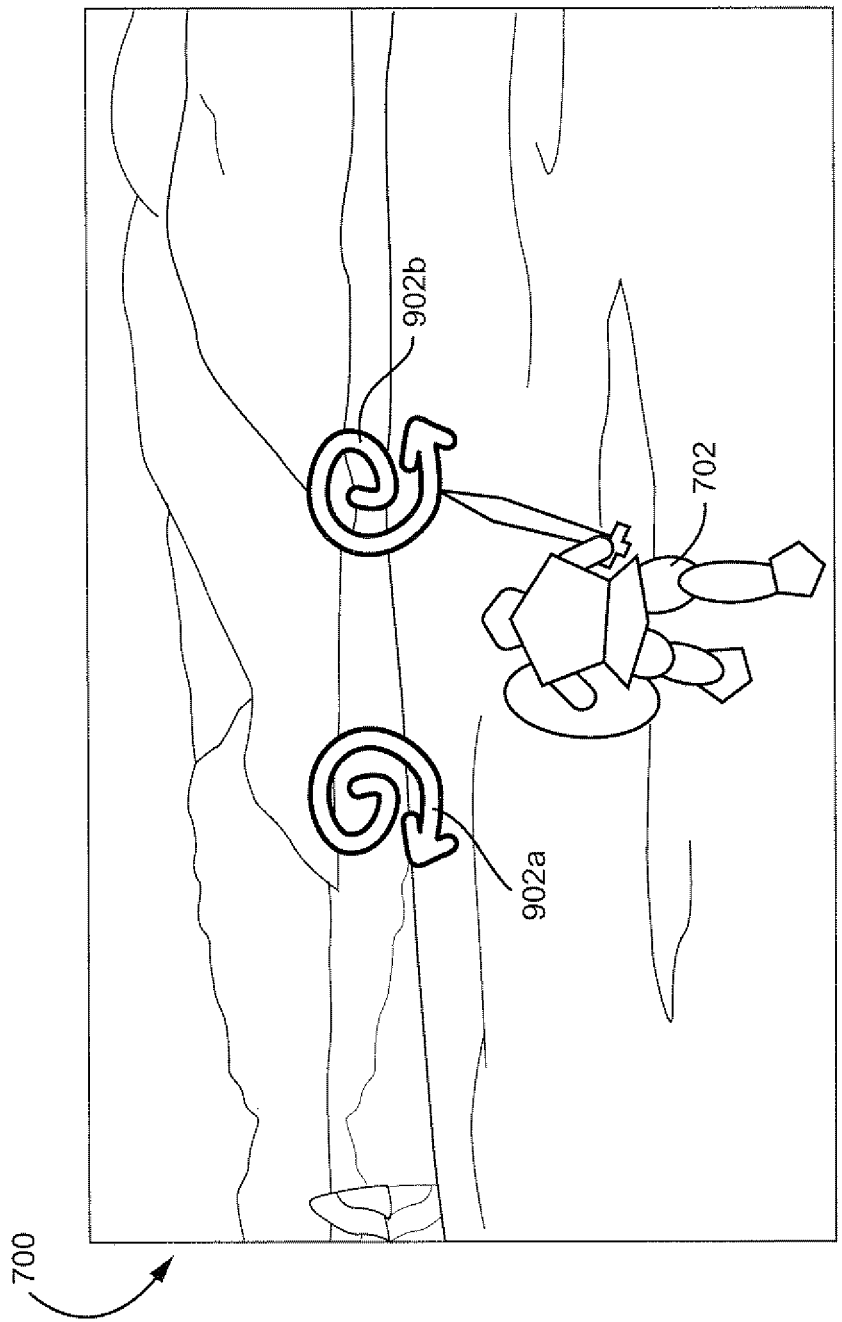
FIG. 4 shows an exemplary game environment with a spell symbol imposed thereon.

FIG. 4 shows an exemplary game environment 700 with a spell symbol 902a, 902b imposed thereon. This is one exemplary illustrative non-limiting implementation of a game world where a character 702 still interacts with the world while the player casts a spell. Symbols 902a, 902b are imposed over the displayed world, so that the player can keep track of what is transpiring in the game while the spell is cast. Alternatively, the game could be paused while the spell is cast. As another example, the player could be taken to an alternate screen, where he or she could not see the game world, but game time would still continue. Other gameflow control methods during casting are also contemplated.

A single symbol or set of symbols 902a, 902b may be displayed, or an entire sequence of symbols may be displayed. The player holding one or more handheld controllers needs to perform the patterns shown on the screen with the respective controller(s). In this example, the player would trace a clock-wise spiral with a left-hand controller and a counter-clockwise spiral with a right-hand controller. As the player is waving one or more controllers around and attempting the gestures, the player is able to better suspend reality and imagine that he or she is actually creating the spell through the gesturing.

Figure 5:
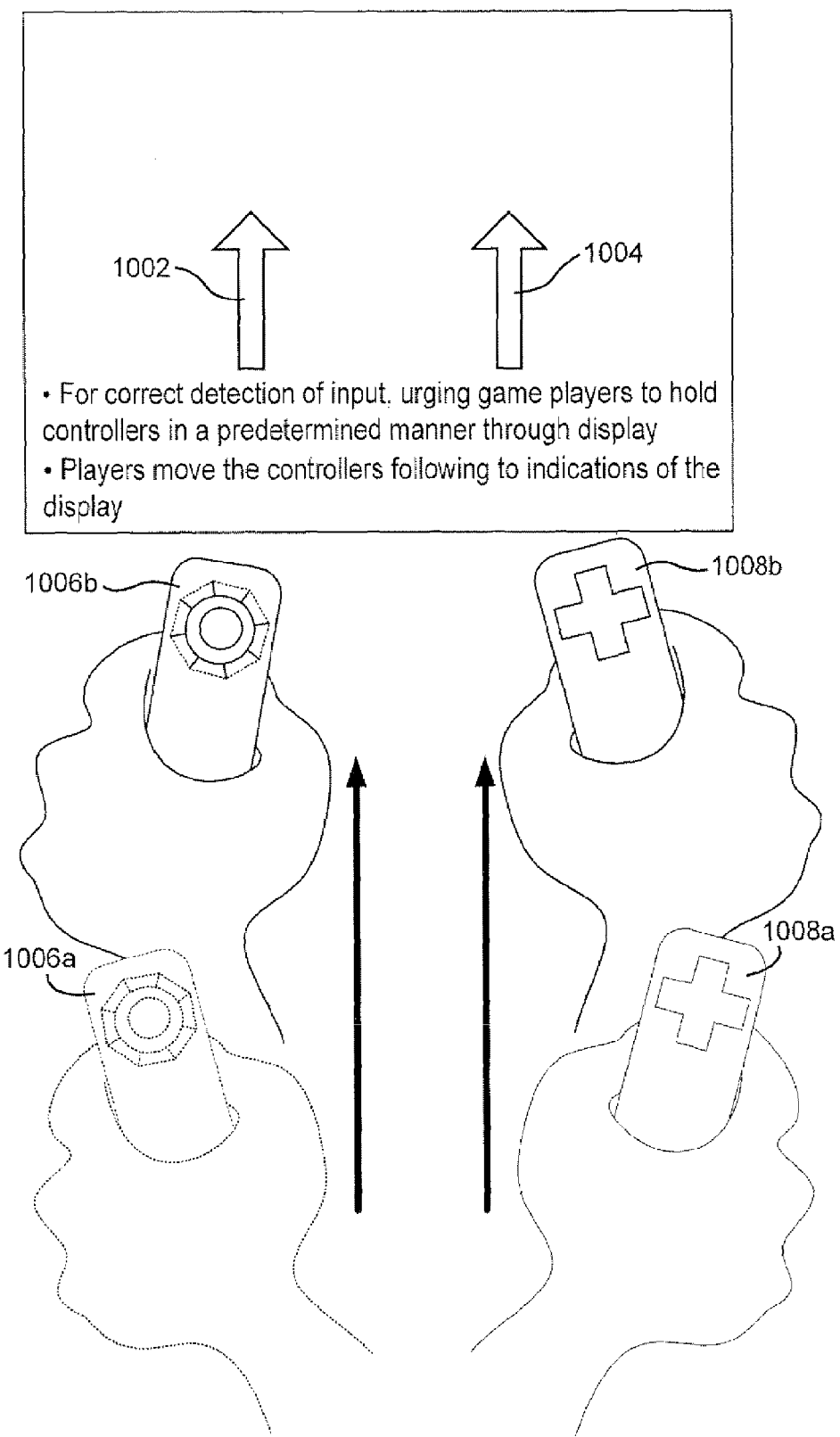
FIG. 5 shows a player following a set of exemplary instructions displayed on a game screen.

FIG. 5 shows a player following a set of exemplary instructions displayed on a game screen. In this exemplary implementation, two instruction symbols (vertical arrows) 1002, 1004 are displayed on a screen. The player, in accordance with the symbols 1002, 1004, moves two controllers from positions 1006a, 1008a to 1006b, 1008b respectively. Thus, instead of simply moving a thumb or a finger to indicate a spell (i.e. pressing a button or moving a joystick), the player has actually gestured with his or her hands.

The instructions, additionally, are not limited to symmetrical or straight-line gestures, but rather can be as simple or as complicated as a game designer desires. Further, the instructions need not be made for both hands, they can indicate a single hand, alternate between hands, or always be performed with a single controller.

In the example, once a spell has been selected, the player casts it by moving the controller(s) according to the on-screen prompts. Gestures may be detected using directional accelerometer input.

According to the exemplary game, gestures are shapes which the player performs by moving one or both controllers. These gestures can also be mirrored to add more variety—for example, the player may be required to perform spirals in opposite directions using both controllers at the same time.

Spell casting requires the player to string together a short sequence of one or more gestures. Each spell may have its own unique sequence which is used every time the spell is cast, allowing players to learn spells as they play through the game. The more powerful the spell, the more complex the gesture sequence associated with it may be.

Spell gestures are performed using a timed pattern matching mechanic. On screen HUD prompts indicate to the player which gesture(s) needs to be performed. Points of light may move along each gesture icon while it is displayed, to indicate which direction the player is to move a controller.

Players may have a limited amount of time to perform each gesture in the sequence. If they fail to complete a gesture before its time runs out, or if they perform the gesture incorrectly, it will compromise the spell strength. The gesture sequence may continue though—casting may not stop or restart if a mistake is made.

Successfully performing a gesture causes its icon to highlight blue and a "good" gesture sound effect to play before the next gesture appears on screen. A failed gesture causes the icon to fade down to grey accompanied by a "bad" gesture sound.

When a player finishes a gesture sequence, the picture formed by the spell's gesture sequence may flash up on screen. Additionally, each of the gestures that form the picture may be highlighted or grayed out, depending on whether or not the player performed each corresponding gesture correctly. The more symbols that are highlighted, the stronger the spell effect might be.

Figure 6:
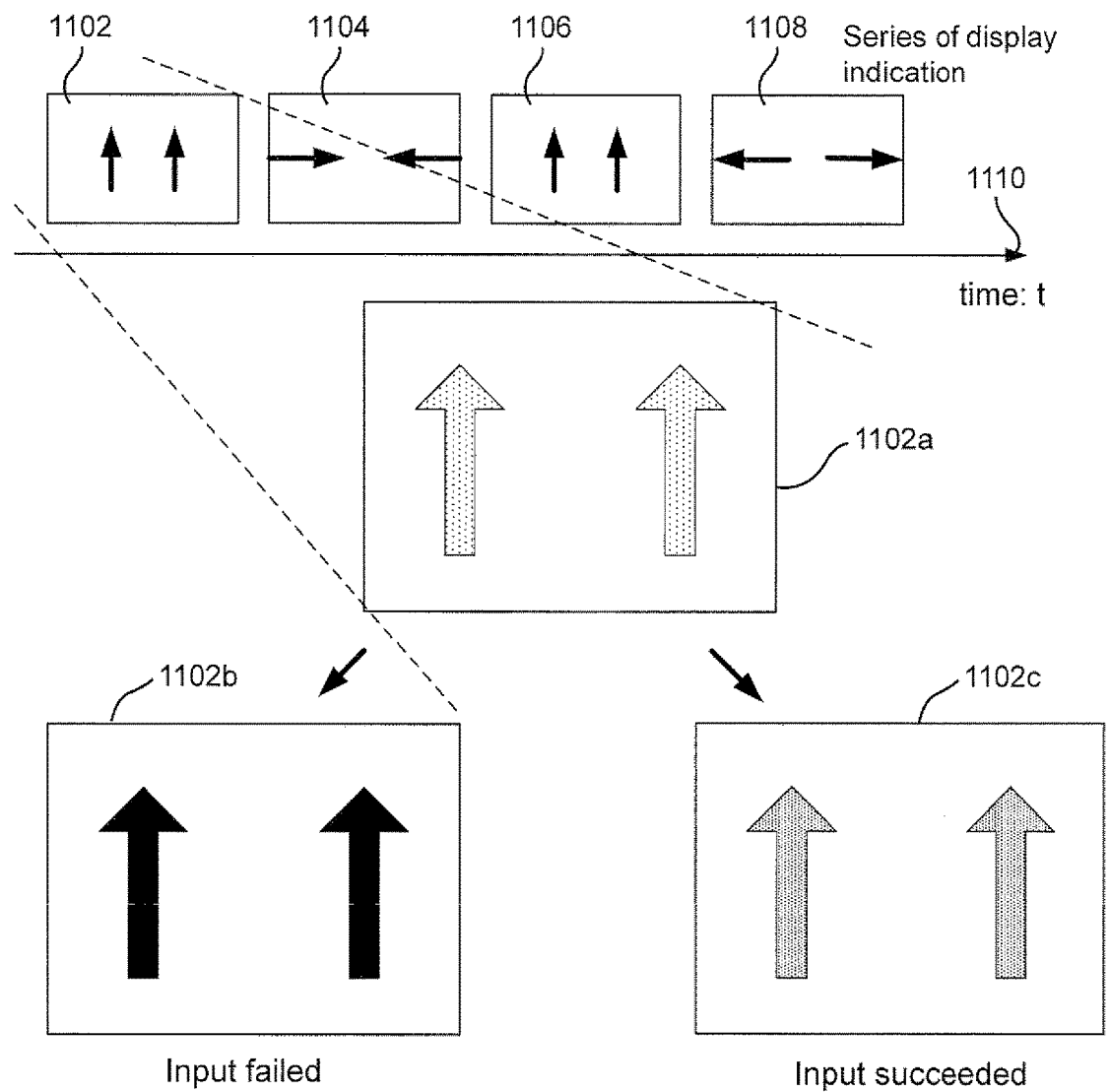
FIG. 6 shows an exemplary sequence of instructions for casting a spell.

FIG. 6 shows an exemplary sequence of instructions 1102, 1104, 1106, 1108 for casting a spell. In this example all four instruction symbols 1102, 1104, 1106, 1108 require the use of both hands, however, single handed instruction symbols are also possible. Further, in a game with more than one character controlled by more than one player, three or more symbols could be displayed, and each player may have to power some portion of the spell by following the respective instructions associated with that player.

In this exemplary illustrative non-limiting implementation, the vertical motions 1102, 1106, require identical hand movements, while the horizontal motions 1104, 1108 are mirror images of each other. Additional combinations, such as a vertical movement with one hand and a horizontal movement with the other, may be implemented. Also, the gestures are not limited to straight line movements.

Instruction 1102 has been blown up to show an initial instruction state 1102a, in which the instruction is provided in a first color. Upon success, the instruction changes to a second color 1102c. Similarly, failure produces a third color 1102b. Methods other than color changing can also be used to indicate success or failure in completing an instruction.

Figure 7:
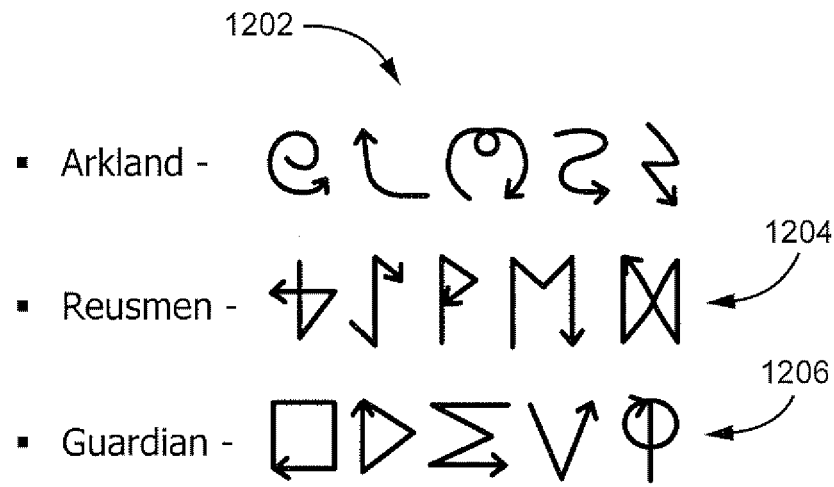
FIG. 7 shows three exemplary schools of magic and exemplary symbols associated therewith.

FIG. 7 shows three exemplary schools of magic and exemplary symbols associated therewith. In this exemplary illustrative non-limiting implementation, each school has common characteristics among the symbols. The Arkland school 1202 primarily has swirled wavy symbols. The Reusmen school 1204 has runic looking symbols. The Guardian school 1206 consists of mathematical symbols.

In this exemplary implementation, if the player is only provided with access to a single school of magic, the player may more easily become familiar with the movement characteristics of his or her school's magic and may progress more quickly in learning spells. This does not have to be the case, however, a player could have access to all schools, or a game could simply have a series of spells, sharing no intentional relation.

Figure 8:
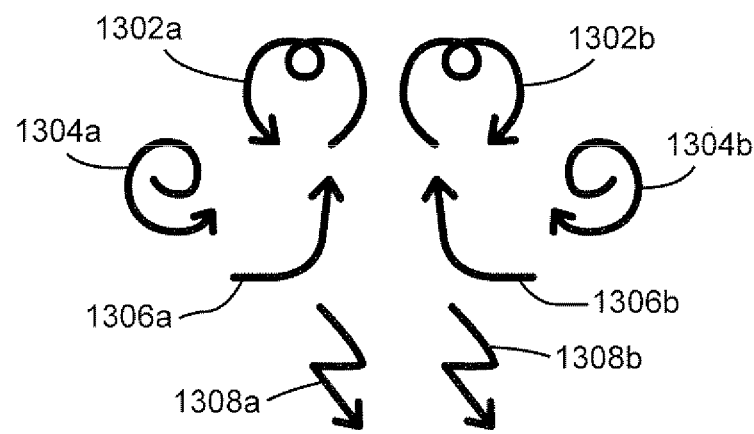
FIG. 8 shows an exemplary spell-casting sequence for casting an exemplary lightning-storm spell.

FIG. 8. shows an exemplary spell-casting sequence for casting an exemplary lightning-storm spell. In this exemplary implementation, although this is not necessary, the gestures for the spell themselves form a pictograph of a storm, with swirling cloud gestures followed by lightning bolt gestures. Initially, the player draws the swirling "Ms" 1302a, 1302b with both hands. Then the player draws the spirals 1304a, 1304b with both hands. This is followed by the upward curves 1306a, 1306b. Finally, the lightning bolts 1308a, 1308b are drawn. Through this gesture process, and with the addition of visual and audio effects, the player can feel as though he or she is gathering the forces of nature into clouds and casting down lightning through gesture based movement.

The game may, as each gesture is performed, show some indicia of power gathering around the player, or may show some preliminary spell results as seen in FIGS. 9A and 9B. Also, the controller(s) can begin to vibrate, game animation can change, lightning can begin to crackle, winds howl, etc. All these effects can be designed to more fully draw the player into the game experience. Any or all of the effects can be omitted as well, or additional methods of immersing the player may be used.

According to the exemplary implementation, a visual effect representing the magical energy being drawn upon by the hero appears during casting. This effect builds in intensity to indicate how accurately the player is casting the spell, becoming more visible based on how closely the player is matching the instructions.

The appearance of this magical energy may depend on the hero's faction—for a Reusmen it might be a swarm of ghostly animal spirits swirling around them, for an Arklander a white light surrounding them, for a Malbett a growing black mist rising from the ground.

Additionally (if feasible) the hero might blend between two casting animation loops—one with their head down and their hands kept close to their chest, the other with their head tilted back and arms held aloft. The better the player is doing, the more the hands-in-the-air animation is blended in.

While the hero is casting a spell, a Power bar may gradually drop to show that their magical power is being drained. The amount of Power spent at any point during casting is equal to the total Power cost of the spell multiplied by the percentage of the glyph/gesture sequence that has been completed. As the Power bar falls past a spell icon, the icon fades back to grey to indicate that the spell can no longer be cast.

If the hero cancels the spell before they finish casting it, the Power bar stops falling and no further Power is taken from them. Otherwise the bar continues to fall until the spell is cast.

Additionally, the software may apply more damage to the player character when casting magic.

FIGS. 9A and 9B show exemplary results of the spell of FIG. 8 cast with varying degrees of success. In FIGS. 9A and 9B, two different results of the lightning storm spell are shown. In both exemplary illustrative non-limiting implementations, the spell is shown as a gathering storm. In both figures, the first two gestures are successful, resulting in the corresponding pictures 1402a, 1402b and 1404a, 1404b. Then, however, the player in FIG. 9A completes the third gesture correctly, while the player in FIG. 9B does not. Thus, while the cloud 1406a has nearly doubled in size, the cloud 1406b has remained the same. Although both players complete the final gesture correctly, the player from FIG. 9A has a much bigger lightning storm 1408a then the player from FIG. 9B. The player from FIG. 9A succeeds in attacking five groups of enemies 1410a, 1412a, and 1414a. The player from FIG. 9B, however, only strikes three groups of enemies 1412b. The enemies of groups 1410b and 1414b remain to give combat.

Figure 10:
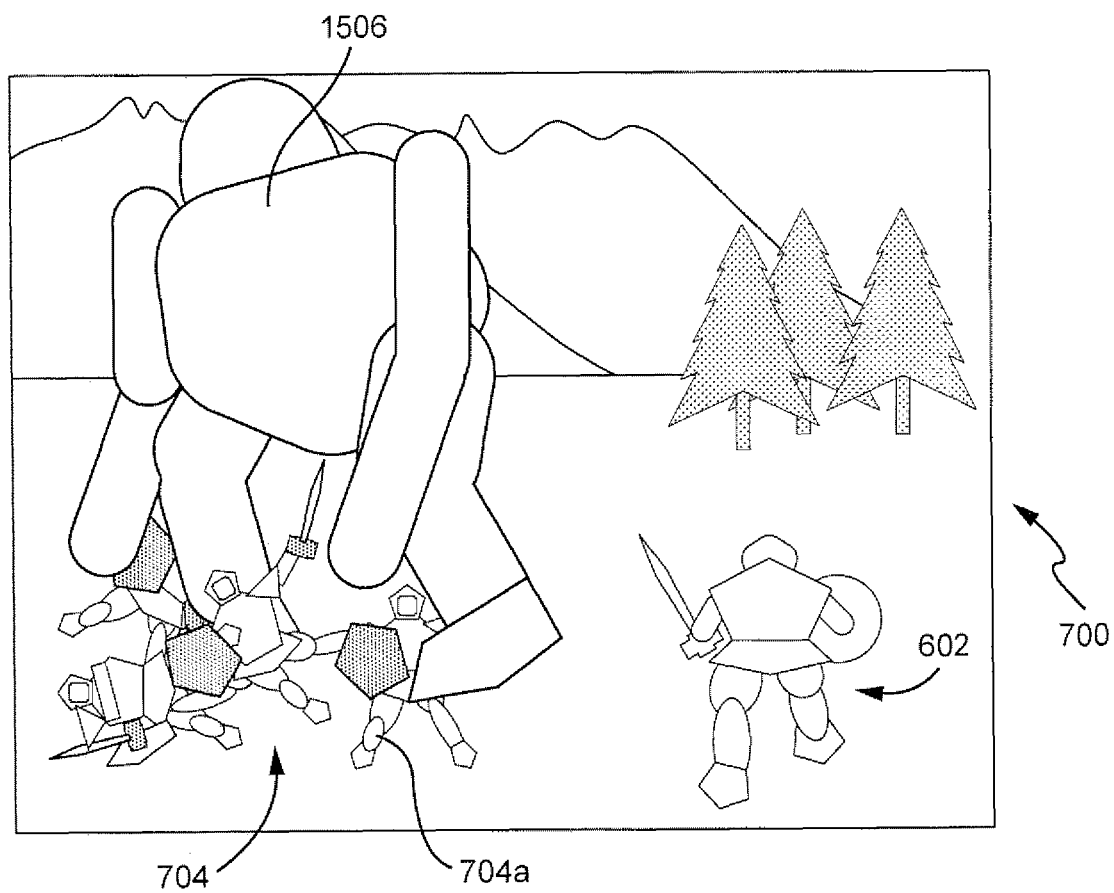
FIG. 10 shows yet another exemplary game environment with an exemplary summoning spell having been cast.

Actual spell implementations may come in many forms, for example, activating special effects or spawning fantasy units (as seen in FIG. 10).

One exemplary illustrative non-limiting implementation for determining spell power is as follows:

$$\text{Spell Strength} = \text{Accuracy}/\sqrt{(\text{Time Taken}/\text{Time Allowed})}$$

In this exemplary implementation, the minimum time taken is capped at half the time allowed, and if the spell was not completed before the timer ran out the time taken is set to be equal to the time allowed.

According to this exemplary implementation, accuracy is the percentage of the gestures in the sequence that were successfully performed. If a gesture required movement of two controllers, failure with respect to either controller is considered a failure of the gesture.

Then, in this exemplary illustrative non-limiting implementation, the spell strength is broken down into four categories:

Perfect—Maximum power
Excellent—80% power
Fair—50% power
Poor—<50% power

If poor is set as the baseline, then perfect is equivalent to 200% power. Additionally, the numbers shown are for convenience and are not intended to be limiting, any number of tiers and power upgrades/downgrade values may be used. In addition to increasing spell power, spell effects can be improved/downgraded/added. For example, an ice storm which normally does damage only, might freeze foes in place with a perfect cast, allowing the character to get off a number of attacks against the frozen foes. These are all exemplary implementations provided for example purposes only.

FIG. 10 shows yet another exemplary game environment 700 with an exemplary summoning spell having been cast. Here the Hero character 602 has summoned up a giant elemental 1506 to trample his foes 604. Either the spell was not performed perfectly or it was insufficient to kill all of his enemies, because at least one enemy 604a remains unharmed. Of course, the elemental 1506 may have also simply not gotten around to smashing enemy 604a yet.

A vast variety of spells and magical effects can be implemented with the present system, the only limits being the imaginations of game designers. Players can experience a whole new type of spell casting, where they have a much more interactive experience with the game environment. Although many of the examples herein have been shown with respect to a single player game, the system taught hereby can be used in all sorts of games.

Many player vs. player and multi-player implementations of the system are possible, and the disclosure with respect to the single player game given herein is not intended to limit this system to games of that type. Nor is the system limited to the RPG game genre.

Exemplary Video Game Platform

Techniques described herein can be performed on any computer graphics system including a personal computer, a home video game machine, a portable video game machine, a networked server and display, a cellular telephone, a personal digital assistant, or any other type of device or arrangement having computation and graphical display capabilities and outfitted with a motion tracked controller. One exemplary illustrative non-limiting implementation includes a home video game system such as the Nintendo Wii 3D video game system. One exemplary illustrative non-limiting implementation is described below, but other implementations are possible.

Figure 11:
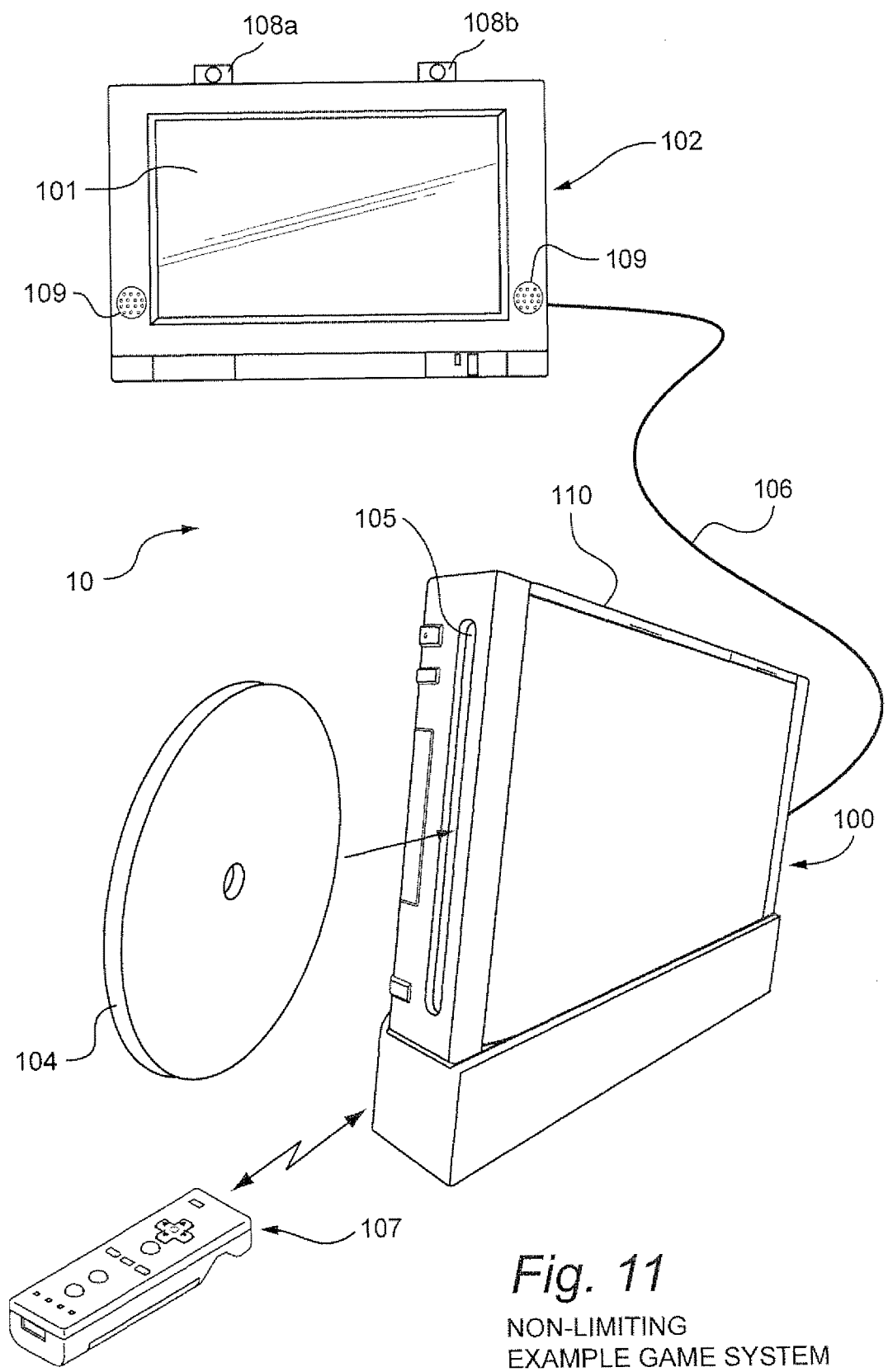
FIG. 11 shows an exemplary external view of a non-limiting interactive computer graphics system in the form of a home video game apparatus for executing a game program.

FIG. 11 shows a non-limiting example game system 10 including a game console 100, a television or other display 102 and a handheld controller 107.

Game console 100 executes a game program or other application stored on optical disc 104 or other memory media inserted into slot 105 formed in housing 110 thereof. The game program (or other application) execution result is displayed on display 102 to which game console 100 is connected by cable 106 or otherwise. Audio associated with the game program or other application is output via television speakers 109. While an optical disk is shown in FIG. 11 for use in storing video game software, the game program or other application may alternatively or additionally be stored on other storage media such as semiconductor memories, magneto-optical memories, magnetic memories and the like and/or downloaded over a network or by other means.

An exemplary illustrative non-limiting handheld controller implementation 107 wirelessly transmits data such as game control (and other) data to the game console 100. The game control data may be generated using an operation section of controller 107. Controller 107 may also wirelessly receive data transmitted from game console 100. Any one of various wireless protocols such as Bluetooth®, RF, IR or other protocols may be used for the wireless transmissions between controller 107 and game console 100.

Exemplary controller 107 also includes an imaging information calculation section (FIG. 15) for capturing and processing images from light-emitting devices 108a and 108b associated with display 102. A center point between light-emitting devices 108a and 108b may be aligned with a vertical center line of display 102. The images from light-emitting devices 108a and 108b can be used to determine a direction in which controller 107 is pointing as well as a distance of controller 107 from display 102. By way of example without limitation, light-emitting devices 108a and 108b may be implemented as two LED modules (hereinafter, referred to as "markers") provided in the vicinity of a display screen 102. The markers each output infrared light. The imaging information calculation section of controller 107 detects the light output from the LED modules to determine a direction in which controller 107 is pointing and a distance of controller 107 from display 102. Although markers 108a and 108b are shown in FIG. 1 as being above television 100, they may also be positioned below television 100 or in other configurations.

Figure 12:
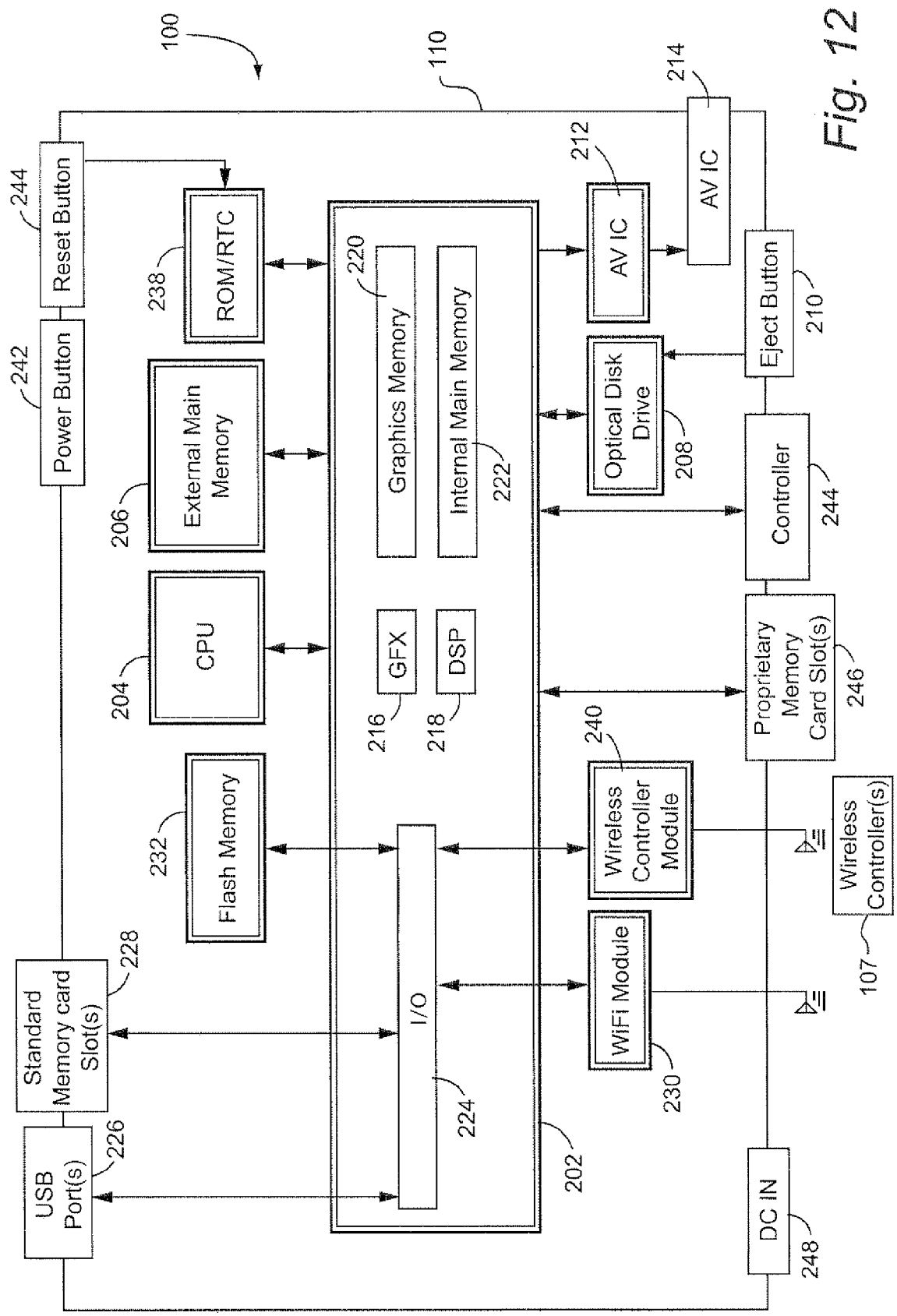
FIG. 12 is a block diagram showing an illustrative internal structure of the game apparatus.

With reference to the block diagram of FIG. 12, an exemplary illustrative non-limiting game console 100 includes a RISC or other central processing unit (CPU) 204 for executing various types of applications including (but not limited to) video game programs. CPU 204 executes a boot program stored in a boot ROM (not shown) to initialize game console 100, and then executes an application (or applications) stored on optical disc 104 which is inserted in optical disk drive 208. User-accessible eject button 210 provided on housing 110 of game console 100 may be used to eject an optical disk from disk drive 208.

In one example implementation, optical disk drive 208 receives both optical disks of a first type (e.g., of a first size and/or of a first data structure, etc.) containing applications developed for execution by CPU 204 and graphics processor 216 and optical disks of a second type (e.g., of a second size and/or a second data structure) containing applications originally developed for execution by a different CPU and/or graphics processor. For example, the optical disks of the second type may be applications originally developed for the Nintendo GameCube platform.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi or other wireless or other LAN module 230, flash memory 232 and wireless controller module 240.

USB ports 226 are used to connect a wide variety of external devices to game console 100. These devices include, by way of example without limitation, game controllers, keyboards, storage devices such as external hard-disk drives, printers, digital cameras, and the like. USB ports 226 may also be used for wired network (e.g., LAN) connections. In one example implementation, two USB ports 226 are provided, but other configurations are possible.

Standard memory card slots (connectors) 228 are adapted to receive industry-standard-type memory cards (e.g., SD memory cards) in one exemplary illustrative non-limiting example. In one example implementation, one memory card slot 228 is provided. These memory cards are generally used as data carriers. For example, a player may store game data for a particular game on a memory card and bring the memory card to a friend's house to play the game on the friend's game console. The memory cards may also be used to transfer data between the game console and personal computers, digital cameras, and the like. Flash memory 232 stores, by way of example without limitation, game save data, system files, internal applications for the console and downloaded data (such as games).

WiFi module 230 enables game console 100 to be connected to a wireless access point. The access point may provide internet connectivity for on-line gaming with players at other locations (with or without voice chat capabilities), as well as web browsing, e-mail, file downloads (including game downloads) and many other types of on-line activities. In some implementations, WiFi module 230 may also be used for communication with other game devices such as suitably-equipped hand-held game devices. Module 230 is referred to herein as "WiFi", which is generally used in connection with the family of IEEE 802.11 specifications. However, game console 100 may alternatively or additionally use wireless modules that conform to other wireless or wired standards.

Wireless controller module 240 receives signals wirelessly transmitted from one or more controllers 107 and provides these received signals to IO processor 224. Any number of separate controllers may be used to provide multi-player inputs. The signals transmitted by controller 107 to wireless controller module 240 may include signals generated by controller 107 itself as well as by other devices that may be connected to controller 107. By way of example, some games may utilize separate right- and left-hand inputs. For such games, another controller (not shown) may be connected to controller 107 and controller 107 could transmit to wireless controller module 240 signals generated by it and by the other controller.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry. By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240 or otherwise.

Proprietary memory card slots 246 are adapted to receive proprietary memory cards. In one example implementation, two such slots are provided. These proprietary memory cards have some non-standard feature such as a non-standard connector or a non-standard memory architecture. For example, one or more of the memory card slots 246 may be adapted to receive memory cards developed for the Nintendo GameCube or other platform. In this case, memory cards inserted in such slots can transfer data from games developed for the GameCube or other platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, connectors 244 may be connected to respective wireless receivers that receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Of course, the power may be derived from one or more batteries or by any other desired means.

GPU 216 performs image processing based on instructions from CPU 204. GPU 216 includes, for example, circuitry for performing calculations and operations for displaying textured and/or shaded three-dimensional (3D) graphics. GPU 216 performs image processing using graphics memory 220 (which may be dedicated for image processing) and internal main memory 222. GPU 216 generates image data for output to television 102 by audio/video connector 214 via audio/video IC (interface) 212. External main memory 206 and internal main memory 222 are storage areas directly accessible by CPU 204. For example, these memories can store an application program such as a game program read from optical disc 104 by the CPU 204, various types of data or the like.

Audio DSP 218 performs audio processing based on instructions from CPU 204. The audio generated by audio DSP 218 is output to television 102 by audio/video connector 214 via audio/video IC 212.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 is depressed for a specified time (e.g., one or two seconds) to turn the console off so as to reduce the possibility of inadvertent turn-off. Reset button 244 is used to reset (re-boot) game console 100.

Figure 13A:
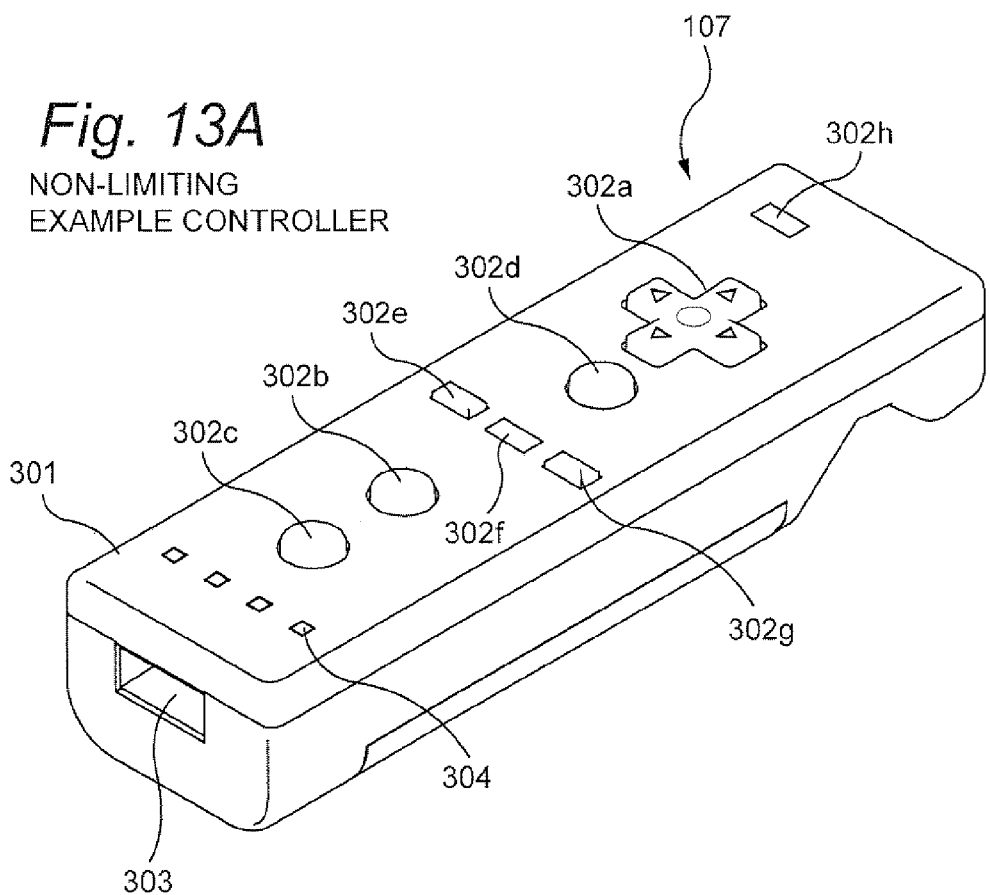
FIGS. 13A, 13B and 14 show different views of an exemplary illustrative non-limiting handheld controller for the video game system of FIG. 1.
Figure 13B:
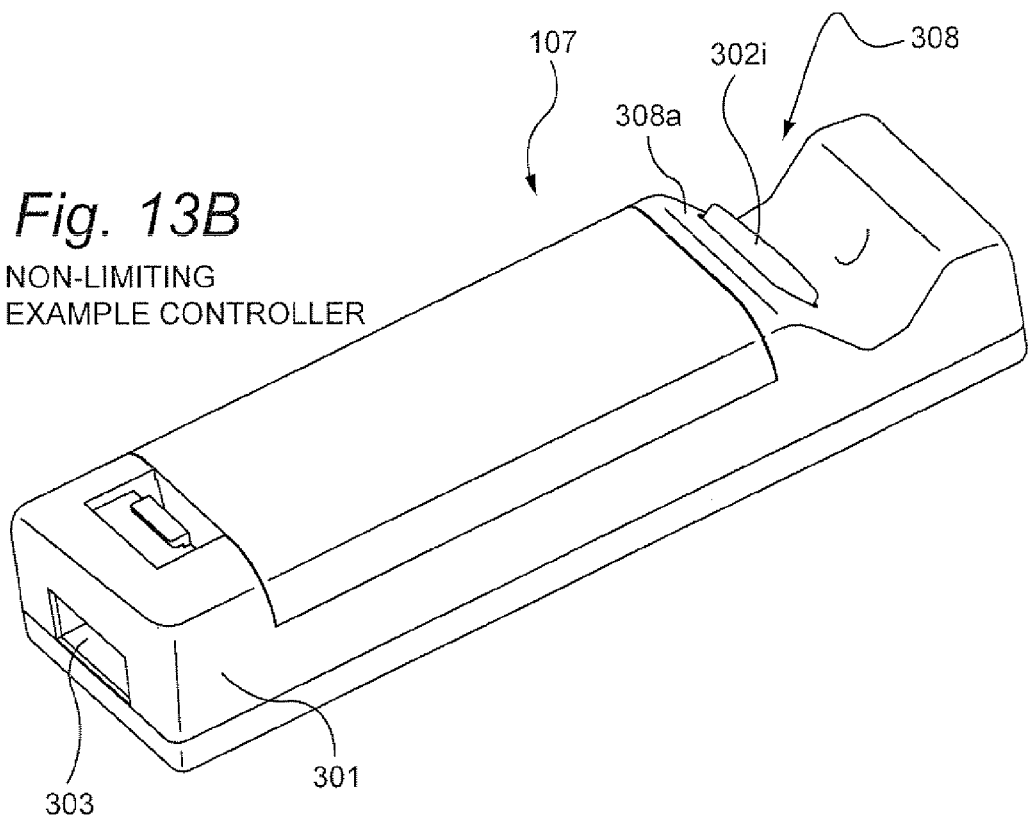
Figure 14:
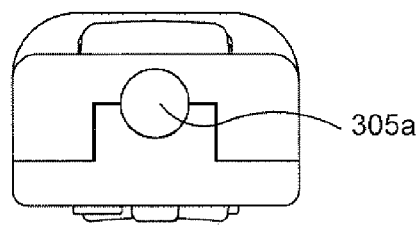

With reference to FIGS. 13A, 13B and 14, example controller 107 includes a housing 301 on which operating controls 302*a*-302*h* are provided. Housing 301 has a generally elongated rectangular shape and is sized to be conveniently holdable in a player's hand. Cross-switch 302*a* is provided at the center of a forward part of a top surface of the housing 301. Cross-switch 302*a* is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 302*a*. By actuating cross-switch 302*a*, the player can, for example, move a character in different directions in a virtual game world, control a ball, attack an enemy, etc.

Cross-switch 302*a* is described by way of example. Other types of operation sections may be used. By way of example without limitation, a composite switch including a push switch with a ring-shaped four-direction operation section and a center switch may be used. By way of further example without limitation, any or all of the following may be used: an inclinable stick such as a joystick projecting from the top surface of housing 301 that outputs signals in accordance with the inclining direction of the stick;

a horizontally slidable disc-shaped member that outputs signals in accordance with the sliding direction of the disc-shaped member;

a touch pad;

separate switches corresponding to at least four directions (e.g., front, rear, right and left) that output respective signals when pressed by a player;

other.

In one exemplary illustrative non-limiting implementation, buttons (or keys) 302*b* through 302*g* are provided rearward of cross-switch 302*a* on the top surface of housing 301. Buttons 302*b* through 302*g* are operation devices that output respective signals when a player presses them. For example, buttons 302*b* through 302*d* are respectively an "X" button, a "Y" button and a "B" button. Buttons 302*e* through 302*g* are respectively a select switch, a menu switch and a start switch, for example. Generally, buttons 302*b* through 302*g* are assigned various (variable) functions in accordance with the application being executed by game console 100. In an exemplary arrangement shown in FIGS. 13A, 13B, buttons 302*b* through 302*d* are linearly arranged along a front-to-back centerline of the top surface of housing 301. Buttons 302*e* through 302*g* are linearly arranged along a left-to-right line between buttons 302*b* and 302*d*. Button 302f may be recessed from a top surface of housing 701 to reduce the possibility of inadvertent depression by a player grasping controller 107.

Button 302h is provided forward of cross-switch 302a on the top surface of the housing 301. Button 302h is a power switch for remote on-off switching of the power to game console 100. Button 302h may also be recessed from a top surface of housing 301 to reduce the possibility of inadvertent depression.

In one exemplary illustrative non-limiting implementation, a plurality (e.g., four) of LEDs 304 is provided rearward of button 302c on the top surface of housing 301. Controller 107 is assigned a controller type (number) so as to be distinguishable from the other controllers used with game console 100 in a multiplayer context. LEDs 304 may be used to provide a player a visual indication of his or her assigned controller number. For example, when controller 107 transmits signals to wireless controller module 240, one of the plurality of LEDs corresponding to the controller type is lit up.

With reference to FIG. 13B, a recessed portion 308 is formed on a bottom surface of housing 301. Recessed portion 308 is positioned so as to receive an index finger or middle finger of a player holding controller 107. A button 302i is provided on a rear, sloped surface 308a of the recessed portion. Button 302i functions, for example, as an "A" button which can be used, by way of illustration, as a trigger switch in a shooting or other game.

As shown in FIG. 14, an imaging element 305a is provided on a front surface of controller housing 301 in one exemplary illustrative non-limiting implementation. Imaging element 305a is part of an imaging information calculation section of controller 107 that analyzes image data received from markers 108a and 108b. Imaging information calculation section 305 has a maximum sampling period of, for example, about 200 frames/sec., and therefore can trace and analyze even relatively fast motion of controller 107. Additional details may be found in application Ser. No. 11/532,328, entitled "VIDEO GAME SYSTEM WITH WIRELESS MODULAR HANDHELD CONTROLLER," filed on Sep. 15, 2006; Ser. No. 11/445,280, entitled "INFORMATION PROCESSING PROGRAM," filed on Jun. 2, 2006; and application Ser. No. 11/441,146, entitled "INFORMATION PROCESSING SYSTEM AND PROGRAM THEREFOR," filed on May 26, 2006. The entire contents of each of these applications are incorporated herein.

Connector 303 is provided on a rear surface of controller housing 301. Connector 303 is used to connect devices to controller 107. For example, a second controller of similar or different configuration may be connected to controller 107 via connector 303 in order to allow a player to play games using game control inputs from both hands. Other devices including game controllers for other game consoles, input devices such as keyboards, keypads, touchpads and output devices such as speakers and displays may be connected to controller 107 using connector 303 or by other means.

For ease of explanation in what follows, a coordinate system for controller 107 will be defined. As shown in FIGS. 13A, 13B and 14, a left-handed X, Y, Z coordinate system has been defined for controller 107. Of course, this coordinate system is described by way of example without limitation and the systems and methods described herein are equally applicable when other coordinate systems are used.

Figure 15:
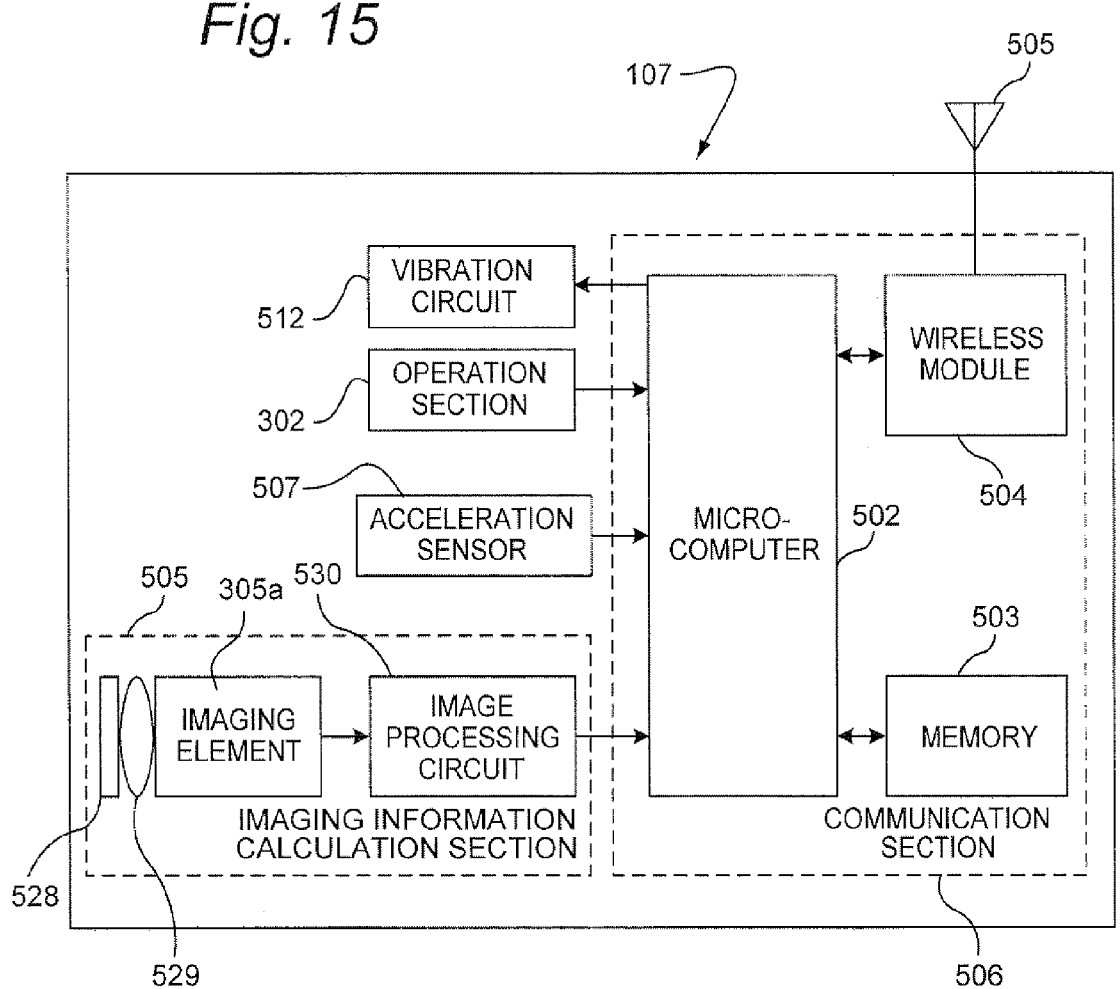
FIG. 15 is a block diagram of an exemplary illustrative non-limiting implementation of the handheld controller.

As shown in the block diagram of FIG. 15, controller 107 includes a three-axis, linear acceleration sensor 507 that detects linear acceleration in three directions, i.e., the up/down direction (Z-axis shown in FIGS. 3A, 3B and 4), the left/right direction (X-axis shown in FIGS. 3A, 3B and 4), and the forward/backward direction (Y-axis shown in FIGS. 3A, 3B and 4). Alternatively, a two-axis linear accelerometer that detects only linear acceleration along each of the Y-axis and Z-axis may be used or a one-axis linear accelerometer that detects only linear acceleration along the Z-axis may be used. Generally speaking, the accelerometer arrangement (e.g., three-axis or two-axis) will depend on the type of control signals desired. As a non-limiting example, the three-axis or two-axis linear accelerometer may be of a type available from Analog Devices, Inc. (ADXL303) or STMicroelectronics N.V. Preferably, acceleration sensor 507 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers as used in acceleration sensor 507 are capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 in one exemplary illustrative non-limiting implementation cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of controller 107 relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 307 is subjected to dynamic accelerations by, for example, the hand of a user.

In other exemplary illustrative non-limiting implementations, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity). Controllers not equipped with motion sensing technology can also be used with the exemplary illustrative non-limiting implementations.

FIG. 15 shows image information calculation section 505 of controller 107 as including infrared filter 528, lens 529, imaging element 305a and image processing circuit 530.

Infrared filter 528 allows only infrared light to pass therethrough from the light that is incident on the front surface of controller 107. Lens 529 collects and focuses the infrared light from infrared filter 528 on imaging element 305a. Imaging element 305a is a solid-state imaging device such as, for example, a CMOS sensor or a CCD. Imaging element 305a captures images of the infrared light from markers 108a and 108b collected by lens 309. Accordingly, imaging element 305a captures images of only the infrared light that has passed through infrared filter 528 and generates image data based thereon. This image data is processed by image processing circuit 520 which detects an area thereof having high brightness, and, based on this detecting, outputs processing result data representing the detected coordinate position and size of the area to communication section 506. From this information, the direction in which controller 107 is pointing and the distance of controller 107 from display 101 can be determined. Controllers not equipped with light detecting technology can also be used with the exemplary illustrative non-limiting implementations.

Vibration circuit 512 may also be included in controller 107. Vibration circuit 512 may be, for example, a vibration motor or a solenoid. Controller 107 is vibrated by actuation of the vibration circuit 512 (e.g., in response to signals from game console 100), and the vibration is conveyed to the hand of the player holding controller 107. Thus, a so-called vibration-responsive game may be realized.

As described above, acceleration sensor 507 detects and outputs the acceleration in the form of components of three axial directions of controller 107, i.e., the components of the up-down direction (Z-axis direction), the left-right direction (X-axis direction), and the front-rear direction (the Y-axis direction) of controller 107. Data representing the acceleration as the components of the three axial directions detected by acceleration sensor 507 is output to communication section 506. Based on the acceleration data which is output from acceleration sensor 507, motion of controller 107 can be determined.

In one exemplary illustrative non-limiting implementation, communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Micro-computer 502 temporarily stores the data supplied thereto in memory 503 as transmission data for transmission to game console 100. The wireless transmission from communication section 506 to game console 100 is performed at a predetermined time interval. Because game processing is generally performed rapidly at for example a cycle of 1/60 sec. (16.7 ms), the wireless transmission is preferably performed at a cycle of a shorter time period. For example, a communication section structured using Bluetooth® technology can have a cycle of 5 ms. At transmission time, micro-computer 502 outputs the transmission data stored in memory 503 as a series of operation information to wireless module 504.

Wireless module 504 uses, for example, Bluetooth® technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 107. Game console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 100 performs application processing. If communication section 506 is structured using Bluetooth® technology, controller 107 can also receive data wirelessly transmitted thereto from devices including game console 100. Controllers 107 connected to a game console or other device by a wire or other means may also be used with the exemplary illustrative non-limiting implementations.

The exemplary illustrative non-limiting system described above can be used to execute software stored on optical disk 104 or in other memory that controls it to implement a video game having a magic system. Also, while a controller provided with motion sensing elements is used in the above example, a system where an external element sensed controller motion could also be used. Exemplary illustrative non-limiting software controlled techniques for implementing such a game will now be described.

Exemplary Illustrative Game Program Flow

Figure 16:
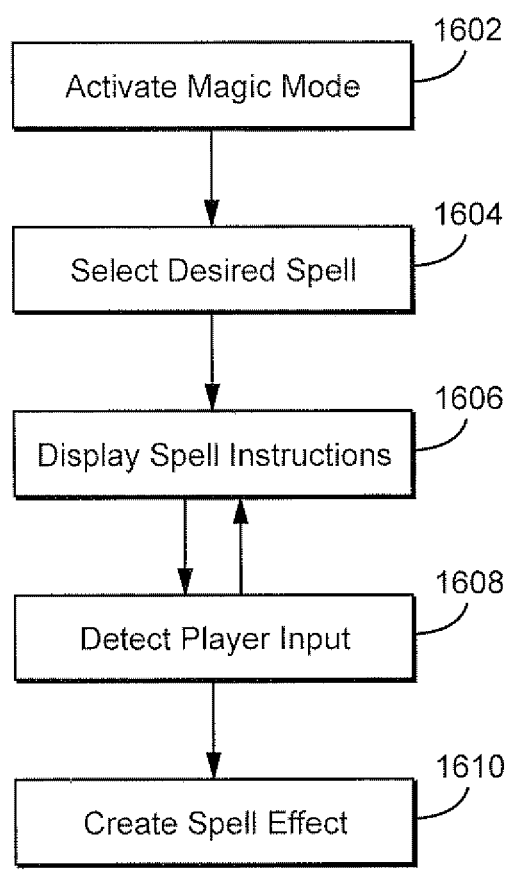
FIG. 16 is an exemplary magic invoking system flow according to one exemplary illustrative non-limiting implementation.

In FIG. 16, an exemplary illustrative nonlimiting flow for a magic invoking system is shown. According to this exemplary implementation, the player actually activates a magic mode before spell selection is performed (1602). This could involve pressing of a button, a gesture with a controller, a series of commands, etc. Once the player has activated the magic mode (1602), the player then selects a desired spell (1604). Again, spell selection can be implemented in various ways. For example, in this illustrative embodiment, while game time slows in magic mode, it does not cease entirely and events continue to transpire around the game character. Thus, if a developer wished to allow the character to retain control over motion, then a directional pad on the controller might be used to move the character while in magic mode, and a movement of the motion sensing controller might cause spell selection. Alternatively, time could stop entirely while the player selects a particular spell (1604).

Once a spell has been selected (1604) the game software then causes one or more instructions to be displayed on a display (1606). According to this implementation, if there is more than one instruction, the game software displays the instructions one at a time. It would also be possible to display the entire instruction set at once, or display a current instruction and a next instruction, etc.

According to this exemplary implementation, once the first instruction has been displayed, the game software detects player input (1608). Player input consists of moving the motion sensing controller in a pattern resembling the symbol shown on the screen. In this exemplary implementation the symbol also has an arrow included, so the player knows in which direction to proceed. For example, if a circle is shown, the arrow helps the player in determining whether it is a clockwise circle or a counter-clockwise circle. The process of displaying an instruction symbol (1606) and detecting a player gesture pattern (1608) continues until all symbols for a particular spell have been attempted.

Once the player has attempted each instruction, the game can then create the spell effect (1610). According to this exemplary implementation, the spell effect power or result is affected by the number of player successes and failures on correctly gesturing in accordance with the displayed instruction symbols. A developer, however, may choose not to take these factors into account, or may select other suitable factors to affect the spell outcome. Additionally, while in this exemplary embodiment the spell continues whether or not a player succeeded with each gesture, the spell could also be stopped the moment a player fails to complete a successful gesture.

Figure 17:
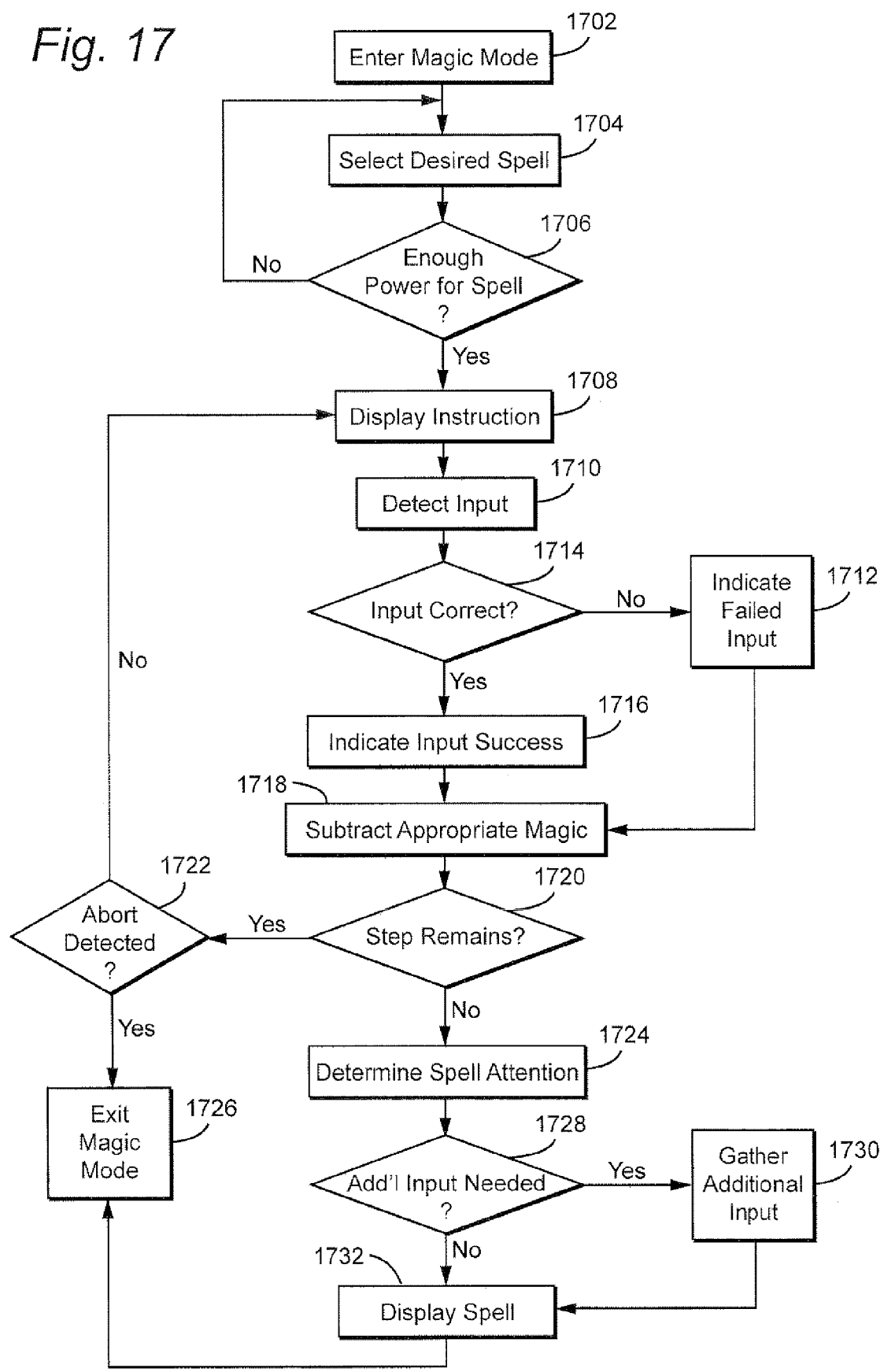
FIG. 17 shows another exemplary magic invoking system flow according to one exemplary illustrative non-limiting implementation.

Some facets a developer may wish to consider include, but are not limited to:

activation of magic spells
selection of spell
the casting mechanism
spell activation, including a consideration of spell quality
targeting of any spells that require a positional component FIG. 17 shows another exemplary magic invoking system flow according to one exemplary illustrative non-limiting implementation. Again, according to this implementation, the player first enters a magic mode (1702). While the player is said to have "entered" a magic mode, in essence this simply results in allowing spell selection and casting. Since motion based control may be used for another feature of the game, such as swinging a sword, the game may need to distinguish between a magic gesture and a sword gesture, hence the magic mode. Other options are available, however. For example, in a game provided with two motion based controllers, one held in each hand, a left hand controller could be used for spell gestures and a right hand controller for sword gestures, allowing a character to fight and cast simultaneously.

After entering magic mode, the player selects a desired spell (1704). In this implementation, the system checks to see if there is enough power for the desired spell (1706), but the system could also simply prohibit selection of spell for which the player had insufficient power.

Once the desired spell is selected (1706), the game software displays a first spell instruction on a display (1708). The player then attempts to match the symbol shown on the screen with a gesture from the motion sensing controller. By gesturing with the controller, the player can feel as if they are summoning up the elemental forces necessary to complete the spell, immersing themselves in the game. Again, although the controller is referred to as a motion sensing controller, a device independent of the controller that detects the controllers motion would also be sufficient.

After the player has attempted an input, the game software checks to see if the input is correct (1710). In this exemplary implementation, the game software checks after a player stops moving a controller or after a time limit expires. The software could, however, provide a constant check, so that if any point the player's input strayed too far afield, the software could register a failed input (1712). In this exemplary implementation, if the input is incorrect after it has been attempted, or if the player did not complete the symbol in a requisite time period, the game software indicates a failed input (1712).

If, however, the player was successful in the input attempt, then the game software indicates a player success (1716). Indicia of success or failure can take a variety of forms. The symbol could turn a different color for each, a sound could play for each, there may only be a change in the symbol for a success or maybe only for a failure, the player could perform a different animation, the controller could tremble, etc. Alternatively, no indication of success or failure may be given at all.

After success or failure has been determined (1714), the game then subtracts an appropriate amount of magic power (1718). In this exemplary implementation, as each gesture is completed, some magic is depleted from the character's store (1718). Also, in this exemplary implementation, the player has the option to quit attempting the spell at any point. If the player does so, then the magic already spent is forfeit. Alternatively, a fizzling version of the spell may be cast, or some other effect may occur.

Once the magic is subtracted, the game checks to see if there are any instructions remaining in the sequence (1720). If there are instructions remaining, the game checks to see if the player has elected to abort the sequence (1722), before proceeding to display the next instruction (1708). If the player has elected to abort magic mode, then the process exits (1726) and the spent magic is forfeit.

If, however, there are no steps remaining, then, according to this exemplary implementation, the game determines how the spell is to be altered based on cast speed and accuracy of gestures. For example, the spell may be given more damage power, a lightning storm may be given more bolts, a hurricane may last longer, a monster may be bigger, etc. Spells can also have a base point which may be downgraded if a spell was performed particularly horribly. Comedic effects can also be included here, such as a spell to summon a dragon might produce a gecko if the player failed on every gesture attempt.

Finally, before the spell is actually displayed (1732), the game software determines if there is any additional input, such as targeting a spell, needed (1728). If a player is facing a vast field of foes, then it may be necessary for the player to select some portion of the enemy to be the recipient of the spell, and it may not be desirable to have this portion randomly selected. If any additional input is needed, the game software prompts the player and gathers the input (1730) and then the spell effect is displayed in the game.

While a specific algorithm for spell processing has been described with respect to FIG. 17, it is for exemplary purposes only, and any suitable method may be used.

Figure 18:
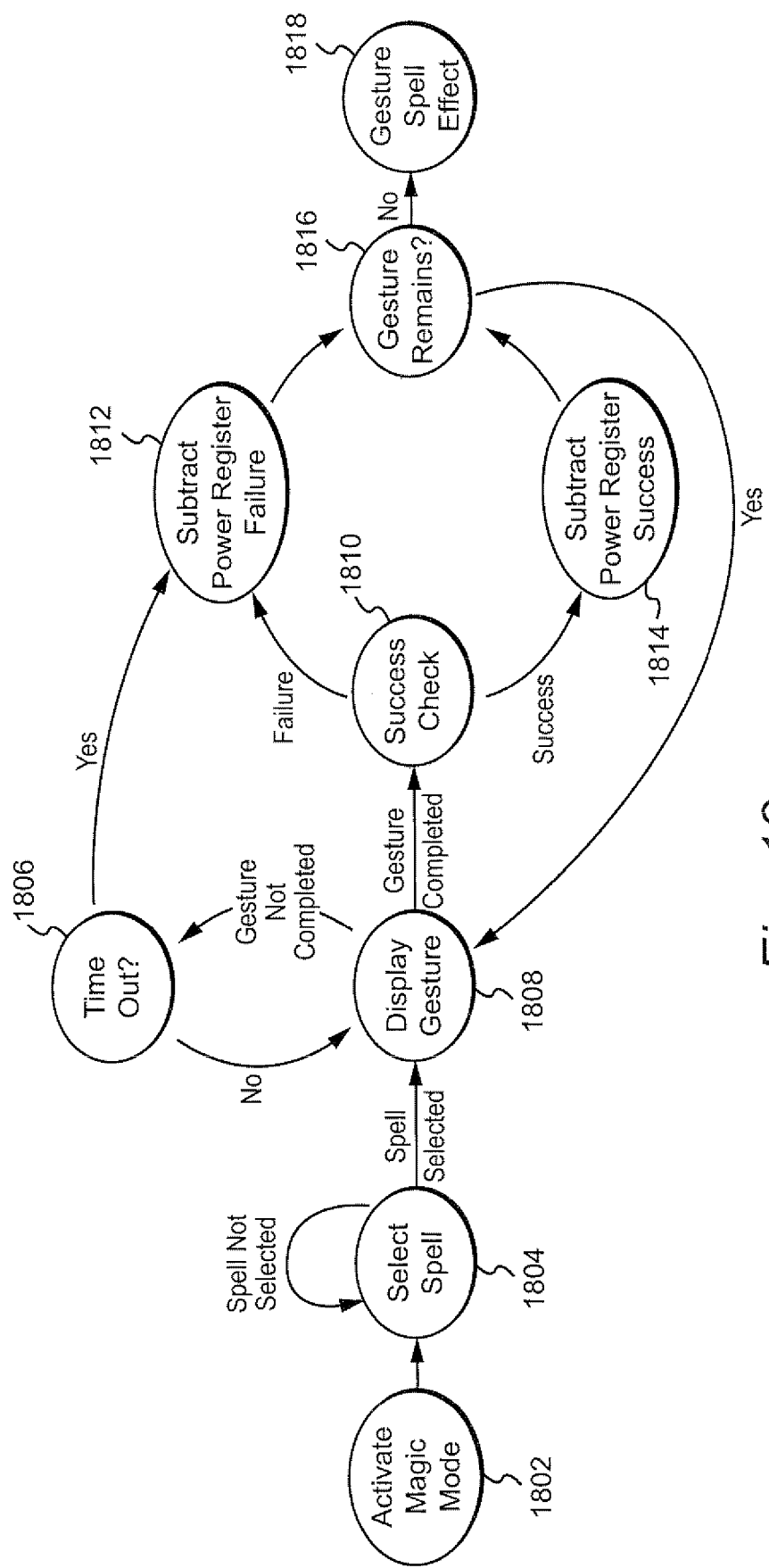
FIG. 18 shows an exemplary state diagram for a magic system.

Another exemplary illustrative non-limiting implementation is shown in the state diagram of FIG. 18. Initially, a player activates a magic mode, or makes some indication that spell-casting is to begin (1802). The player then, in this exemplary implementation, is provided with the option to select a spell (1804). As long as the player does not select a spell, the program waits for a spell to be selected. Once a spell is selected, the first gesture for that spell is displayed (1808).

While the spell gesture is being displayed (1808), there will likely be at least a point where the spell gesture is shown but not completed. Since, in this exemplary implementation, there is a time limit, the program will check while the gesture is not completed to ensure the time limit has not expired (1806). If the time limit expires before the gesture is completed, the program registers the gesture as failed and subtracts some portion of magic power (1812).

If the gesture is completed before the time limit is expired, the program then checks for a success or failure (1810). Upon failure, the program subtracts some power and registers a failure (1812). Upon success, the program subtracts some power and registers a success (1814). In either event, the program then checks to see if any gestures are remaining to be performed (1816). If so, the program returns to the gesture display state (1808), otherwise, the selected spell effect is generated (1818).

Again, this state diagram is shown as an exemplary state diagram for explanatory purposes only and is not intended to limit the scope of the invention in any way.

Exemplary Game Sample Code (for illustrative Exemplary Purposes Only)

Included below is exemplary illustrative non-limiting code examples for various aspects of the game provided as a non-limiting example herethroughout:

3 main modules could be considered for implementation:—
1) an action component that integrates the magic system with other systems
2) a magic system manager that handles all player interaction.
3) a HUD component that updates according to the state of the magic system—this will be a HUD overlay
4) Spell classes that would describe different characteristic behaviour of each spell. For example, gesture sequences, time allowed Impact range and strength etc.

Spell classes may also be useful. The responsibility for any specific behaviour dictates that most of this functionality should be contained within the individual spell classes. The spells themselves could be designer editable and as such could have reflected base-classes and instances.

The exemplary magic system could be based on 4 main modules, namely
1. cPlayerActionMagic
2. cMagicSystemManager
3. cSpell
4. cHudMagicOverlay cPlayerActionMagic will be responsible to activate the magic mode and shift player control to the cMagicSystemManager. The magic system module will then process input and update states as well as keep track of the available spells. This information can then be used by the Hud component for displaying appropriate icons on the screen. After the magic system module has finished processing all of the states the magic action will be popped off from the current players stack of actions and control will resume to normal mode.

cPlayerActionMagic

An action class could to be put in place which will inherit from a cAction.h base class. The purpose of this class would be to shift the player control to the magic system and let it handle all the user interaction. Magic system manager can be invoked through this class to handle different states (discussed below) of magic spell.

This class could be instantiated from other action modules currently at the top of the action stack.

The main interface to this class would be:
UpdateAction( )

This is a pure virtual function and could be implemented by all the player actions. It would return an eUpdateAction value which will signal the activation or deactivation of the magic mode in the game. UpdateAction would record input from a cPlayerControl class and pass it on to a Magic system module for further processing.

cMagicSystemManager

The magic system could store internal state so that the response to player input will be contextual during its update. Likely states will be:

```
SELECTING_SPELL
CAST_MODE
ACTIVATING_SPELL
TARGETING_SPELL
ENDING_SPELL
```

It may also store details of the current spell selected, as well as spell availability. There may also be spell classes that will be reflected classes that may be "owned" by hero classes. The magic system will likely need to know about the spells owned by the current player. Any interaction with the spell data or current player status would be facilitated by the Action module.

This could be a singleton class which will be responsible to manage states of the magic system. It may be invoked from cPlayerActionMagic. Following is the main data and behavior that may be implemented by this class:

```
[DATA]
enum eMagicState{
        SELECT_SPELL,
        CAST_SPELL,
        ACTIVATING_SPELL,
        TARGETING_SPELL,
        ENDING_SPELL
};
enum eMagicMode{
        MAGIC_CONTINUE,
        MAGIC_END
};
emSpellIndex;   //this will keep track of currently selected spell.
emGesturelevel; //this will keep track of next gesture in gesture sequence
mGestureSequence; // will hold the sequence entered by the user to
be matched with the intended        //sequence from spell object
cSprite *mSpellIcons[NUMOFALLSPELLS]; //pointer to icon graphic
data for all the spells
cSprite*mGestureIcons[NUMOFGESTURES]; //pointer to all the gestures
[INTERFACE]
Update( )
Getgestures( )
GetAvailableSpells( );
        [UTILITIES]
        getgesturefromSpell( )
        getspellsFromSpell( )
UpdateSelect( )
UpdateCast( )
UpdateActivate( )
UpdateTarget( )
        UpdateEnd( )
IsSelected( )
```

Based on the current state, the magic system module may process input and update the pointer to graphic data which then can be used by the Hud component to display icons and prompts on the screen.

CHudMagicOverlay

This Hud component may query the manager class on each update for the graphic icon to be displayed on the screen. cHudMagicOverlay would inherit from cHuditems and may implement the virtual interface update ( ) and draw( ). These may in turn invoke update and draw methods of corresponding current magic system state. No player control would be handled in the Hud component.

```
[INTERFACE]
Update( )
Draw ( )
[UTILITIES]
UpdateSelect( )
UpdateCast ( )
UpdateActivate ( )
...
DrawSelect( )
DrawCast( )
...
cSpell
```

This class may hold all of the spell data and reflect it in order to be tuned and modified by the designer. The class may be queried and updated by magic module and unit module both. Therefore it might implement some helper functionality.

```
[DATA]
Impactstrength
TotalGestures
TimetoComplete
Gestures[TotalGestures]
Gesturetime[TotalGestures]
[INTERFACE]
IsEnoughMana( )
UpdateMana( )
CalculateQuality( )
[UTILITIES]
```

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A method of tracing symbols using a handheld input device wirelessly coupled to a computer-based system comprising a processor, memory and a display interface connected to a display device, the handheld input device including a sensor that can sense spatial controller pointing and/or motion in free space, the method comprising:
    displaying, on the display device, a symbol comprising a sequence of cursively-connected line segments and/or arcs;
    instructing a user to trace the displayed sequence of cursively-connected line segments and/or arcs comprising the symbol by moving the handheld input device in free space;
    detecting, with the processor, at least spatial input device pointing and/or motion by monitoring signals sensed by the sensor and provided by the handheld input device to the computer-based system;
    determining, with the processor, in response to monitoring the signals, whether the user moves the handheld input device in free space to gesture the displayed sequence of cursively-connected line segments and/or arcs; and
    varying a degree of effectiveness of a game action based on the gesturing of the displayed sequence of cursively-connected line segments and/or arcs that is determined based on the user's movement of the handheld input device in free space, the game action using a parameter corresponding to a strength defined by, at least, an accuracy of tracing the sequence divided by a value produced based on a quotient derived from a time taken for completing the tracing of the sequence of cursively-connected line segments and/or arcs and a time allowed for completing the tracing of the sequence of cursively-connected line segments and/or arcs.

2. The method of claim 1, wherein two handheld input devices are spatially moved to provide input, each handheld input device being held in a different hand.

3. The method of claim 1, further comprising providing feedback if the user moves the handheld input device to gesture the displayed sequence of cursively-connected line segments and/or arcs.

4. The method of claim 1, wherein the game action is displayed on the display device.

5. The method of claim 1, wherein the handheld input device transmits the signal to the computer-based system.

6. The method of claim 1, wherein the degree of effectiveness is greater when the accuracy of tracing the sequence of cursively-connected line segments and/or arcs is greater.

7. A method of instructing player input to a video game controller capable of detecting spatial controller pointing and/or motion along a plurality of axes, comprising:
    displaying a sequential series of cursively-connected line segments and/or arcs on a display, the cursively-connected line segments and/or arcs defining a pattern in which a player is to spatially trace, in free space, using at least one handheld controller containing an inertial sensor;
    detecting, with a processor remote from the handheld controller, aspects of the spatial pointing and/or motion of the handheld controller in response to signals the inertial sensor senses and which the handheld controller transmits to the processor;
    determining, for the cursively-connected line segments and/or arcs in the sequential series, whether or not the detected aspects of the spatial pointing and/or motion of the handheld controller in free space was gestured in an instructed direction; and
    varying a degree of effectiveness of a game action based on the gesturing of the displayed sequence of cursively-connected line segments and/or arcs that is determined based on the detected aspects of the spatial pointing and/or motion of the handheld controller in free space, the game action using a parameter corresponding to a strength defined by, at least, an accuracy of tracing the sequence divided by a value produced based on a quotient derived from a time taken for completing the tracing of the sequence of cursively-connected line segments and/or arcs and a time allowed for completing the tracing of the sequence of cursively-connected line segments and/or arcs.

8. The method of claim 7, wherein the displaying further includes displaying a sequential series of instructions on a display, the instructions each defining two patterns in which the player is to simultaneously spatially move two handheld controllers using separate hands.

9. The method of claim 7, further including displaying, in conjunction with the displayed pattern, at least one visual indicia that indicates in which direction the at least one handheld controller is to be moved.

10. The method of claim 9, wherein the visual indicia include moving light points that move along the displayed pattern.

11. In a system including a processor coupled to a memory and a display, the processor executing software to display information on the display, the processor in wireless communication with a sensor that moves with a user's body part in free space, a method for interacting with an interactive media system to instruct a user how to perform a task, the method comprising:
    graphically displaying, on the display, at least one choreographic pattern comprising a sequential series of cursively-connected line segments and/or arcs to prompt a user to attempt to mimic said displayed choreographic pattern by tracing in free space;
    sensing pointing and/or motion with the sensor that moves with a user's body part in free space;
    detecting, with the processor, whether said sensor has sensed a pointing and/or motion signal having a timing that could correspond to the displayed choreographic pattern;
    determining, with the processor, in response to the sensor sensing the signal, whether the user moves the sensor in free space to gesture the displayed at least one choreographic pattern; and varying a degree of effectiveness of a game action based on the gesturing of the displayed sequence of cursively-connected line segments and/or arcs that is determined based on the user's movement of the sensor in free space, the game action using a parameter corresponding to a strength defined by, at least, an accuracy of tracing the sequence divided by a value produced based on a quotient derived from a time taken for completing the tracing of the sequence of cursively-connected line segments and/or arcs and a time allowed for completing the tracing of the sequence of cursively-connected line segments and/or arcs.

12. The method of claim 11, wherein said graphically displaying comprises graphically displaying a sequence of choreographic patterns to prompt the user to attempt to mimic each displayed graphical pattern in said sequence by tracing each displayed graphical pattern in free space.

13. The method of claim 11, wherein said sensing includes sensing free space motion of at least one handheld input device.

14. The method of claim 11, wherein said sensing comprises simultaneously sensing instantaneous positions of a left-handed handheld input device and a right-handed handheld input device.

15. A system for teaching a user how to form a symbol, comprising:
   a computer readable storage medium storing a game program;
   a processor device operable to execute the game program; and
   at least one handheld controller in communication with the processor device, the handheld controller including an inertial sensor that can sense aspects of pointing and/or motion of a user operating the handheld controller in free space, wherein
   execution of the game program by the processor device causes at least one instruction comprising a sequential series of cursively-connected line segments and/or arcs to be displayed on a display connected to the processor device, wherein the at least one instruction instructs a player to move the controller in free space to trace the displayed sequential series of cursively-connected line segments and/or arcs, wherein the game program determines, via the processor device, whether the user moves the handheld controller in free space to gesture the displayed sequential series of cursively-connected line segments and/or arcs and varies a degree of effectiveness of a game action based on the gesturing of the displayed sequential series of cursively-connected line segments and/or arcs that is determined based on the user's movement of the handheld input device in free space, the game action using a parameter corresponding to a strength defined by, at least, an accuracy of tracing the sequence divided by a value produced based on a quotient derived from a time taken for completing the tracing of the sequence of cursively-connected line segments and/or arcs and a time allowed for completing the tracing of the sequence of cursively-connected line segments and/or arcs.

16. The system of claim 15, wherein a plurality of instructions are displayed, the instructions comprising displayed symbols.

* * * * *